Jan. 22, 1952    G. G. MOZZANINI ET AL    2,583,301
METHOD AND APPARATUS FOR CONTROLLING MACHINES
DRIVEN BY DIRECT CURRENT MOTORS
Filed Aug. 6, 1947    8 Sheets-Sheet 1

Georges Gabriel Mozzanini
and Maurice Lebertre
INVENTORS
By George Hloory
Their Attorney Georges Gabriel Mozzanini
and Maurice Lebertre
INVENTORS Jan. 22, 1952   G. G. MOZZANINI ET AL   2,583,301
METHOD AND APPARATUS FOR CONTROLLING MACHINES
DRIVEN BY DIRECT CURRENT MOTORS
Filed Aug. 6, 1947   8 Sheets-Sheet 4

Georges Gabriel Mozzanini
and Maurice Lebertre
INVENTORS
By George H. Corey
Their Attorney Georges Gabriel Mozzanini
and Maurice Lebertre
INVENTORS By George W. Corey
Their Attorney Georges Gabriel Mozzanini
and Maurice Lebertre
INVENTORS By George H. Corey Their Attorney

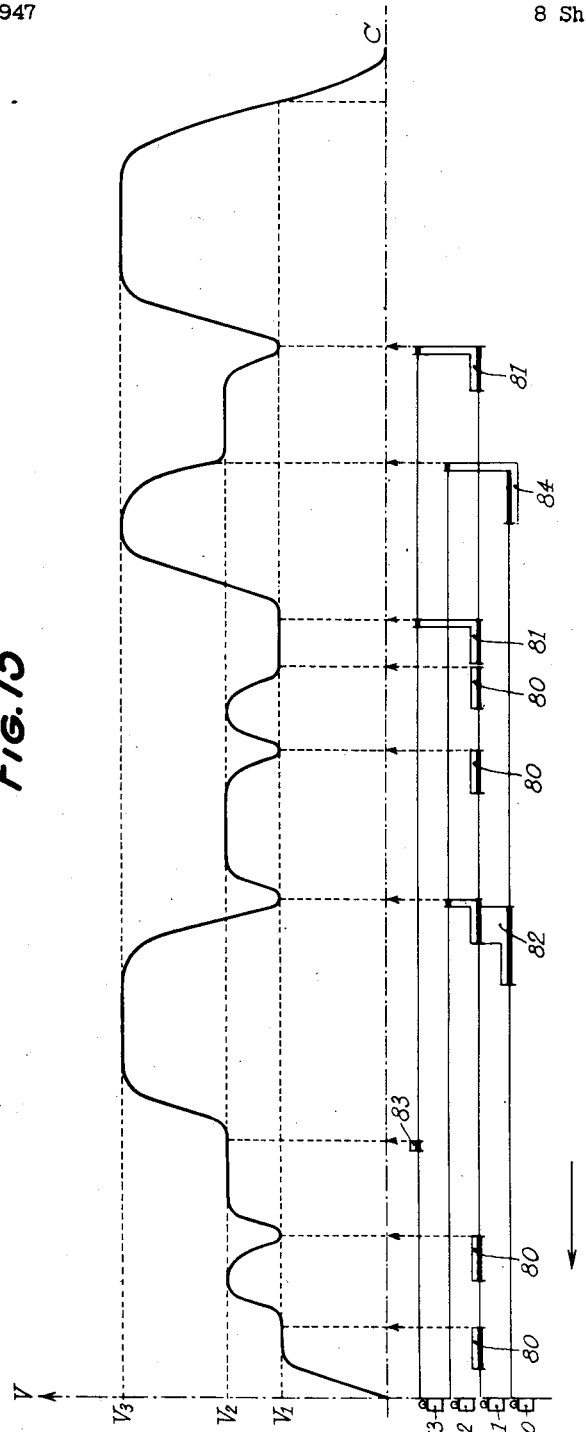

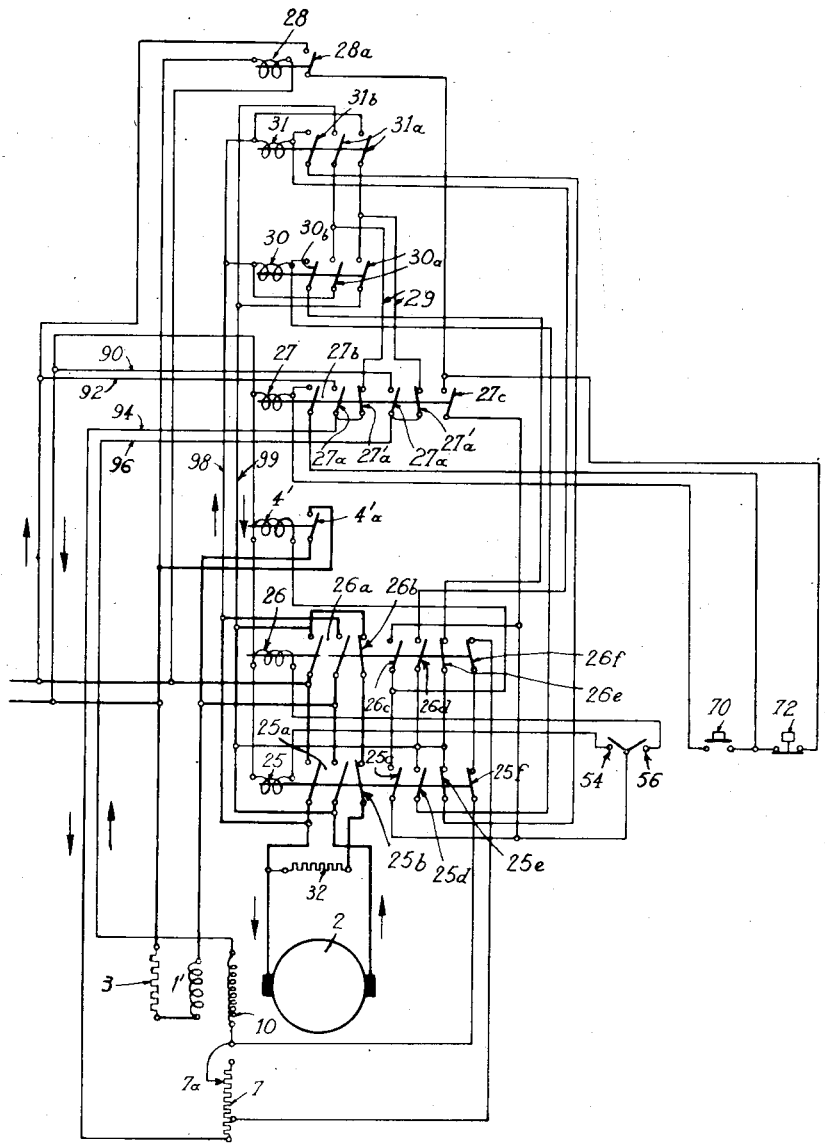

Patented Jan. 22, 1952

2,583,301

UNITED STATES PATENT OFFICE 2,583,301

METHOD AND APPARATUS FOR CONTROLLING MACHINES DRIVEN BY DIRECT-CURRENT MOTORS

Georges Gabriel Mozzanini, La Garenne Colombes, and Maurice Lebertre, Draveil, France Application August 6, 1947, Serial No. 766,670
In France December 15, 1941

Section 1, Public Law 690, August 8, 1946
Patent expires December 15, 1961

40 Claims. (Cl. 318—396)

This invention relates to a method and apparatus for controlling the speed of a direct current motor by variation of the shunt field excitation.

The invention in a particular application thereof relates to the control of the speed of a direct current motor driving a machine, such as a machine tool or the like, in which the machine must be operated at a plurality of different speeds which are required to be accurately determined and maintained, for example, for the cutting and return stroke operations of a planer, the table of which must be accelerated and decelerated, brought to a stop, reversed, and accelerated and decelerated in the reverse direction.

In the control of direct current motors by control of the excitation of the shunt field by conventional means, the motor may be accelerated from standstill to a given speed desired to be attained and thereafter may be continued in operation at such speed. This acceleration may be accomplished in some cases merely by throwing the motor directly on the line with a resistance in series with the shunt field such as will provide for starting and for attaining desired speed. In most cases the shunt field rheostat may be set for a low resistance or may be short circuited for starting and the rheostat may be operated to effect increase of the speed after the motor starts. Where such a conventional motor is utilized to drive a machine requiring frequent starting and stopping, which may also include reversal of the motor to operate the machine in reverse direction, the speed to which it is desired to accelerate the motor is not rapidly attained. In the operation of a machine tool such a desired speed may be that which is suitable for entrance of the tool into the workpiece, as in the operation of a planer. Since in such machine tool operations the entrance speed is limited because of the shock prejudicial to the life of the tool which occurs upon engagement of the tool with the workpiece and also because inaccuracies in the machining are produced in the entrance portion of the workpiece if the speed is too high, the speed at which the cutting of the workpiece is accomplished is less than the possible cutting speed when, as ordinarily is the case, the cutting is effected at the entrance speed. This limitation of the cutting speed severely limits the production of the machine tool. In many machines, such as planers, the table and the moving parts are necessarily heavy, and especially where the weight of the workpiece is great, the inertia of these moving parts and the rotor of the motor taken as a whole is so great that the acceleration to the desired speed is not accomplished except after a substantial time. Where the speed to be attained is high this time is greater than where the speed to be attained is lower.

A conventional shunt field motor the speed of which is controlled by a field rheostat, moreover, upon being disconnected from the supply will continue rotation for a number of revolutions or fraction thereof which depend upon the speed at which the motor is being operated, even when such a motor is provided with the conventional braking resistance. When such a motor is connected to drive a machine requiring frequent starting and stopping and especially a machine tool such as a planer requiring repeated starting and stopping and reversal at the end of each stroke, the machine may not be stopped at a precise point after the completion of the cutting operation of the tool upon the workpiece. In such a conventional drive for a planer, for example, the table of the planer will travel a greater distance beyond the point of exit of the tool from the workpiece when the speed at which the cutting is effected is high than when this speed is low. Where the mass of the workpiece being machine is large and adds considerably to the mass of the able and the other moving parts and the rotor of the motor, the inertia of this increased mass causes additional variation in the point of stopping which is greater at greater speeds than at reduced speed of cutting.

It is a broad object of the invention to control the speed of a direct current motor and to effect variations in the speed thereof so as to accomplish acceleration of the motor to a desired speed more rapidly than with conventional apparatus and with greater precision as to the amount of rotation of the motor and movement of the part driven thereby which will be required in starting from standstill or in increasing the speed from the point at which the change in speed is initiated.

It is another broad object of the invention to control the speed of a direct current motor and to effect variations in the speed thereof so as to accomplish the deceleration of the motor from any speed at which it is running to any desired reduced speed or to standstill with greater precision than is secured ordinarily with conventional apparatus as to the amount of rotation of the motor or movement of the part driven thereby after the reduction in speed has been initiated.

It is a more specific object of the invention to provide means for controlling the speed of a direct current motor by variation of the shunt field excitation thereof so that a desired increase in the speed thereof either from standstill or from a given running speed is attained more rapidly than with conventional apparatus.

It is another object of the invention to provide means for accelerating a direct current motor from a standstill condition to a predetermined speed within a predetermined number of revolutions of the motor or fraction thereof by controlling the shunt field excitation of the motor.

It is a further object of the invention to provide a method and the apparatus for carrying out the method of operating a machine tool to effect engagement of the tool with the workpiece at a predetermined cutting speed, which speed may be attained from a standstill position of the movable part of the machine tool substantially within a predetermined distance of movement of this movable part.

A still further object of the invention is to provide a method and the apparatus for carrying out the method of machining a workpiece in a machine tool in which either from a standstill position or from a reduced speed of operation the motor and the movable part of the machine tool driven thereby are rapidly accelerated to the desired speed for a given operation, and thereafter the speed is further similarly rapidly increased for some other purpose.

With respect to the broad object of the invention which relates to deceleration of the motor it is another object of the invention to effect the reduction in speed in such a manner that regardless of the speed from which the reduction is initiated substantially the same speed may be reached in a predetermined rotation of the rotor of the motor.

A further object of the invention is to provide means for effecting the reduction in the speed of a direct current motor from any given operating speed so that the motor will come to a stop after having rotated through the same angular movement regardless of the speed from which the reduction was initiated.

It is a still further object of the invention to provide means for effecting reduction in the speed of a direct current motor by controlling the shunt field excitation thereof from any given operating speed substantially to the same low speed at which conventional braking action may be applied to the motor to bring the motor to a standstill.

It is an additional object of the invention to provide a method and the apparatus for carrying out the method of reducing the speed of the movable member of a machine tool driven by a direct current motor so that the tool will exit from the workpiece at a predetermined speed regardless of the cutting speed utilized, and the machine thereafter will travel to a precise point in the total movement of the movable part of the machine tool and will stop upon completion of a predetermined movement after exit of the tool from the workpiece.

Another object of the invention is to provide improved means for controlling the operation of a direct current motor driving a member of the machine required to be reciprocatably moved and to effect starting, running, stopping and reversal of the motor for this purpose.

A corollary object of the invention is to provide a control for a direct current motor to effect reciprocation of a movable part of a machine driven thereby concomitantly with rapid acceleration to a predetermined speed and subsequent precise deceleration to standstill in the manner which has been referred to above.

Still another object of the invention is to provide means for controlling the operation of a direct current motor driving the movable part of a machine so as to effect increases and decreases in the speed of the movable part during the total travel of the part and at predetermined points in this travel, these changes in speed, where desired, being effected in accordance with the rapid acceleration and the precise deceleration which have been referred to above.

An auxiliary object of the invention is to provide means auxiliary to the above referred to control means for insuring a controlled deceleration and stopping of the motor regardless of its speed or direction of rotation in the event of failure of the current supply.

An additional auxiliary object is to accomplish controlled deceleration and stopping in the event of failure of the supply in such a manner that the control means may become immediately operable in the same manner as before such failure upon restoration of the supply subject to the control of the operator.

It is an additional broad object of the invention to operate a machine tool driven by a direct current motor so as rapidly to accelerate the movable part of the machine tool to a speed suitable for entrance of the tool into the workpiece, thereafter to increase the speed to a high cutting speed suitable for the machining of the particular workpiece, deceleration to a speed suitable for exit of the tool from the workpiece, and thereafter either further to effect deceleration preparatory to stopping or to continue movement at any desired speed which may be a fast speed higher than the cutting speed during movement of the workpiece with the tool out of engagement therewith.

An important aspect of the invention relates to the broad object thereof of controlling the speed of a direct current motor to accomplish acceleration of the motor more rapidly than with conventional apparatus and with greater precision as to the amount of rotation of the motor from standstill or from the point at which the change in speed is initiated before reaching the desired speed. It is a feature of the invention in this aspect thereof that means are provided for accelerating the rotor after starting at a rate determined by a characteristic curve of speed of the motor for a running speed which is higher than that which it is desired to reach and which would be attained if the acceleration of the motor were continued along such characteristic curve. For the purposes of the invention, in driving a machine of a given type such, for example, as a planer, the motor is constructed so as to be capable of operating according to a characteristic speed curve which leads to a maximum running speed higher than any speed which is desired to be attained in the operation of the planer, particularly in the cutting stroke of the planer when the motor is under high load. It is characteristic of such a curve of the motor speed that the rate of rise of the speed would be greater than if the motor were controlled to operate on a characteristic to reach only the desired operating speed, for example, the cutting speed of the planer. It is a significant feature of the invention that in accelerating the motor along such a characteristic leading to a high speed that the desired running speed will be reached much quicker than if the motor were controlled to operate along the characteristic leading to the desired running speed.

As the speed of the motor increases along the steep characteristic leading to the high speed above the desired running speed and approaches the desired running speed it is a feature of the invention in this aspect thereof that the control of the motor is changed so as to condition it for operation at the desired running speed. The control means is so constructed and is so operated in consideration of the design characteristics of the motor that as the desired speed is closely approached a sharp change is made from operation along the steep characteristic curve leading to the high speed to operation at the desired running speed. Nevertheless, the motor smoothly continues to run at the desired running speed. The result obtained is that this desired running speed is reached much sooner than it would have been reached by the conventional acceleration of the motor along the characteristic leading to the desired running speed. A substantial saving in time, therefore, is secured in reaching the operating condition, for example, the cutting speed of a machine tool, which is of particular importance in the operation of the machine tool in which repeated operations are performed and in which repeatedly the motor must be started and stopped and again started.

Another feature of the invention in this aspect thereof is that the desired speed to be attained, which may be the speed for producing, for example, the entrance of the tool into the workpiece in the operation of a machine tool, is reached not only in a short time, that is, a short travel of the workpiece relative to the tool in a planer, but this desired speed may be precisely predetermined and may be substantially reached and not substantially exceeded prior to or following the entrance of the tool into the workpiece until further control is effected. Moreover, in a similar manner, after such desired speed has been reached, for example, the requisite entrance speed of the tool, the speed of the motor again may be rapidly increased along a characteristic leading to the high speed above the second speed desired to be attained so that a second desired operating speed, for example, the cutting speed in the operation of the machine tool, may be reached in a much shorter time than with conventional means. The invention thus provides for effecting the cutting operation in a shorter time than would be the case if such acceleration were produced in the conventional manner along a characteristic curve leading merely to the desired cutting speed. Moreover, since in conventional practice ordinarily the cutting speed is limited to the entrance speed of the tool, or if it exceeds such suitable entrance speed there is risk of damage to the tool or the workpiece, this risk may be completely avoided and the optimum conditions of both entrance and cutting secured by the method of acceleration in accordance with the invention. The time for the machine tool operation also may be greatly reduced because the invention makes it possible to utilize a higher cutting speed than with conventional methods. The saving in time for each cut becomes very large where a large number of successive cuts on a workpiece must be made.

A further feature of the invention is of importance in the aspect thereof which relates to acceleration. In the operation of a machine such as a machine tool, because of the nature of the operation, for example, the form of the workpiece or other conditions of the machining operation, it may be desirable to exit the tool from the workpiece without reducing the speed thereof. In such case, after exit of the tool the speed of the motor may be still further increased up to a higher operating speed which may be the maximum operating speed to produce movement of the machine or travel of the tool, for example, at a high rate of speed between two successive cutting operations on a workpiece while the tool is out of engagement therewith. Thus a great saving in time is effected not only because of the running at the high rate of speed but because this high or fast speed is reached in a shorter time than with conventional means.

For the purpose of carrying out the method of controlling the speed of a motor and of operating a machine, such as a machine tool, driven thereby the invention in the particular embodiment thereof hereinafter described preferably utilizes means for controlling the excitation of the shunt field of the direct current motor. This means includes a rheostat operable in a manner similar to the usual shunt field rheostat of a direct current motor having a member hereinafter usually refered to as a slider movable along the resistance to vary the amount of resistance which is connected in series with the shunt field. The slider of this rheostat may be set for the attainment of any desired operating speed, for example, the desired cutting speed in the operation of a machine tool. This rheostat is further provided with a slider which is for the purpose of determining the excitation of the shunt field less than the excitation for the operating or cutting speed to produce a fast speed of the motor higher than the operating or cutting speed. As these sliders are movable along the rheostat to any position the operating speed or the "fast speed" may be determined in any desired relation to each other. Any particular speed for operation or cutting may be selected by suitably positioning the operating speed slider. The "fast speed" slider then may be positioned to connect a greater amount of resistance of the rheostat in series with the shunt field when it is in the circuit than is connected by the operating speed slider. As will be more fully described in connection with the drawings, automatic means are provided in accordance with the aspect of the invention relating to acceleration to connect the current-carrying portion of the rheostat as determined by the operating speed slider in series with the shunt field at a suitable time in relation to the initial start of the motor to produce the acceleration along a speed characteristic curve leading to a high rate of speed above the desired operating speed. When it is desired to operate at a "fast speed," for example, between cuts in a machine tool operation or for the return stroke without cutting, automatic means also are provided for changing the connections so that the current-carrying portion of the rheostat which is in series with the shunt field is that portion which is determined by the "fast speed" slider.

A distinctive feature of the invention in the acceleration aspect concerns the means utilized in connection with the shunt field rheostat in order to accomplish the change from operation along the characteristic leading to a high speed to the desired operating speed. This change in its broader aspects is accomplished by means of a resistance which is connected at the proper moment in parallel with the current-carrying portion of the rheostat to reduce the resistance of the rheostat and thereby to increase the shunt field excitation. In the embodiment herein disclosed this parallel connection is effected quickly but only after the acceleration has proceeded to the required extent along the steep curve leading to the high speed. The change of excitation thus produced, therefore, is effective very quickly to limit further rise of speed of the motor and the motor smoothly continues its rotation precisely at the speed determined by the combined resistance of the current-carrying portion of the rheostat and the resistance thus connected in parallel therewith. This parallel resistance, hereafter usually will be referred to as the "super-adjustment resistance." As will be clear from a more detailed description of the apparatus disclosed in the drawings, other steps for acceleration of the motor speed may be accomplished by particular means cooperating with the means here generally referred to and with the "super-adjustment resistance" for producing further increase in the speed of the motor for particular purposes.

A second important aspect of the invention relates to the broad object thereof for controlling the speed of the direct current motor to accomplish the deceleration thereof and to bring the motor and the part driven thereby to stop at a precise point in the movement thereof after initiation of the deceleration. The invention in this aspect thereof provides means for decelerating the rotor of the motor from any running speed along a deceleration curve which will bring the motor to a predetermined low speed which preferably is substantially the same or within a relatively narrow range regardless of the speed from which the deceleration of the motor was initiated. In producing such deceleration of the motor to bring the motor and the driven part to a stop, the invention provides means for accomplishing the reduction to this low speed from such operating speed during a predetermined angular movement of the rotor of the motor, that is, a predetermined movement of the tool relative to the work-piece in a machining operation. This low speed will be referred to as the "minimum operating" speed of the motor.

It is a significant feature of the invention in this aspect thereof that the reduction of speed from any given operating speed may be effected to any other operating speed during predetermined angular movement of the rotor of the motor, and therefore during a predetermined movement of the workpiece relative to the tool in the operation of a machine tool driven by the motor. Because of such precision the speed of the machine may be reduced, for example, to one which is suitable for exit of the tool at the proper exit point on the workpiece. Because of the precision of movement of the motor and of the parts driven thereby, moreover, when the speed has been reduced from a given operating speed to a reduced operating speed, further reduction in speed to the minimum operating speed preparatory to stopping the motor may be effected during predetermined movement of the motor and the driven part. Since the reduction is effected ultimately preferably always substantially to the minimum operating speed, whether such reduction is effected from a high operating speed or from a lower operating speed, the final step of deceleration to arrive at standstill may be accomplished always in the same manner. For this final deceleration the invention may utilize in cooperation with the novel means of the invention a conventional braking means, preferably a braking resistance connected at the proper time across the armature of the motor. The invention in this final deceleration step, however, also secures the advantage of the condition of high excitation of the shunt field produced by the means of the invention during at least one preparatory step of deceleration of the motor, so that the braking action accomplished by the conventional means is of greater effect than would be the case if this conventional braking action merely were applied to the motor with the excitation only that corresponding to the running speed which would be the condition when the motor is merely disconnected from the supply.

In this deceleration aspect of the invention, with the motor running at a given operating speed above the minimum operating speed and a suitable amount of resistance of the rheostat connected in series with the shunt field to maintain this operating speed, in accordance with an important feature of the invention the deceleration is initiated by what hereinafter will be referred to as the "first preparation" step. In this step the amount of resistance connected in series with the shunt field is abruptly changed to a reduced amount which is in a predetermined relation to the speed at which the motor is running. For this purpose, in a particular embodiment of the invention, means are provided for connecting in parallel with the current-carrying portion of the rheostat which determines the operating speed the unused or non-current-carrying portion of this rheostat, these two portions of the rheostat constituting the whole of the resistance available for the attainment of the maximum operating speed of the motor. While for practical purposes certain other resistances and connections are utilized to provide for this feature of the invention, in general the amount of resistance in the portions of the rheostat, that is, the non-current carrying portion and the current-carrying portion which become connected in parallel, are in relation to each other inversely with respect to the relation of the two speeds from and to which the motor is decelerated. That is to say, when the motor is operating at a higher speed with a large amount of current-carrying resistance of the rheostat connected in series with the shunt field, a small amount of resistance is available in the remainder or non-current-carrying portion thereof to be connected in parallel with the current-carrying portion to effect the "first preparation" step of the method of speed reduction. If, however, the speed at which the motor is operated is low, the amount of resistance in the current-carrying portion of the rheostat is small compared to the amount of the non-current-carrying portion thereof, so that the effect of this non-current-carrying portion is very much less when connected in parallel than in the first instance. This "first preparation" step of the method of speed reduction of the invention is an important feature thereof for control of the speed reduction either for arriving at a reduced operating speed or at the minimum operating speed from which minimum operating speed ordinarily further reduction concomitantly with braking will be effected to bring the motor and the parts driven thereby to a precise stop.

In order to bring the motor to a precise stop when the speed exceeds the minimum operating speed, ordinarily a "second preparation" step of reduction of the speed of the motor is utilized. For this purpose a predetermined part of the current-carrying portion of the shunt field resistance is short-circuited, thus abruptly to produce a high excitation and a strong deceleration effect. While this action in principle may be accomplished by short circuiting the whole of the rheostat, for practical reasons and for the purpose of providing for suitable starting of the motor after bringing it to a stop, certain resistances and connections more particularly referred to hereinafter in connection with the drawings are utilized. In general, however, the "second preparation" step is carried out by means provided according to the invention which cooperate to produce the desired sequence of the first and second preparation steps. After the motor in the "first preparation" step has been reduced to a speed in a predetermined relation to the operating speed from which the reduction was initiated, the "second preparation" step which ordinarily will bring the motor substantially to the minimum operating speed may be completed immediately before the effecting of the braking action by conventional or other means.

Within the scope of the invention the sequence of three steps, namely, "first preparation," "second preparation" and braking of the motor may be completed in such close succession to each other that the speed of the motor is reduced and its rotor brought to a stop substantially along a smooth curve of deceleration. Moreover, from the point in the movement of the rotor of the motor and of the part driven thereby, such as the table of a planer, at which the deceleration from the operating or cutting speed is initiated, the rotor of the motor will rotate only through a predetermined angular movement and the table of the planer will move only through a predetermined length of its stroke to a stopping point at a predetermined distance from such initial point of deceleration and the motor and the table will stop precisely at this stopping point.

In cooperation with the means for producing acceleration and deceleration of the motor in accordance with the two general aspects which have been described above, various other control means are utilized to make possible automatic operation of a machine, such as a machine tool, driven by the motor and particularly a machine, such as a planer, which requires reciprocating movement of its table, this reciprocating movement being accomplished by forward rotation of the motor operatively connected thereto after starting the motor, stopping of the motor, starting in the reverse direction and stopping of the motor after completing the reverse or return stroke of the table. Such cooperating means are so interconnected with the particular means providing the features above described in connection with the methods of acceleration and of deceleration of the motor that all of the changes in speed which are desired to be produced are automatically produced after starting of the operation has been manually initiated. Moreover, the means hereinafter more particularly described in connection with the drawing are provided for manual operation of the motor in either direction at a suitable speed.

In a third important aspect the invention provides for effecting in a novel manner changes in the speed of operating a machine tool, and particularly one in which the tool is required to enter the workpiece to effect a cutting operation and to exit from the workpiece at the end of the cutting operation. The sequence of speeds utilized will hereafter be referred to as the Berthiez cycle and makes possible substantial savings in the time for a machining operation while insuring high quality of the work.

In accordance with this cycle in order to avoid damage to the tool or to the workpiece the tool is entered into the workpiece at a suitable reduced speed. When the workpiece has been engaged by the tool concomitantly with starting of the cutting action the speed of the workpiece relative to the tool is increased to the desired cutting speed, preferably the maximum cutting speed for the particular machining operation, and the cutting is continued at this speed. As the tool approaches the exit from the workpiece the speed of the workpiece relative to the tool is reduced to a suitable speed for exit of the tool from the workpiece and the tool passes out of engagement with the workpiece. Such exit speed ordinarily may be the same as the entrance speed but may be different to suit particular conditions. Thereafter the speed of the workpiece relative to the tool may be increased or it may be continued at the reduced speed for engagement with a tool in a subsequent operation or the workpiece may be brought to stop. In accordance with the invention preferably these changes in speed are accomplished by controlling the speed of a direct current motor driving the machine tool but the invention broadly in this aspect is not limited to driving the machine with such a motor.

The invention in this aspect also may utilize the novel methods of acceleration and deceleration of a direct current motor hereinabove described which are accomplished by controlling the shunt field excitation thereof. This specific form of the Berthiez cycle may take advantage of rapidly attaining the tool entrance speed within a precise movement of the movable member of the machine tool from starting and after the tool has engaged the workpiece, again effecting rapid acceleration to the cutting speed. In reducing the speed for exit of the tool the method of securing precise movement of the workpiece relative to the tool and thereafter bringing the workpiece to a precise stop may be used. As the workpiece thereby is stopped at a precise distance from the tool the invention in this aspect also has the advantage that the requisite entrance speed again may be reached within a precise distance in a machining operation in which the workpiece is reciprocated relative to the tool.

In the auxiliary aspect of the invention above referred to the invention provides means for bringing the motor and the parts driven thereby to a stop in the event of failure of the supply. These means cooperate with the speed control means which have been generally described above and, on the other hand, do not interfere with normal operation of these control means or with the renewed operation thereof after such interruption of the supply. These auxiliary means, however, provide not only for the connection of a braking resistance across the armature of the motor in the conventional manner, this connection being automatically accomplished upon failure of the supply, but also for maintaining until the motor is stopped such excitation of the shunt field of the motor as will make effective the action of braking resistance. The means provided by the invention for this purpose are arranged, however, to operate only in the event of such failure of the supply and as a safety measure to insure stopping of the motor and the parts driven thereby so as to prevent such continued movement of the motor as would carry these driven parts by their inertia beyond safe positions, for example, movement of a machine tool table on its bed so as to overhang dangerously. Such stopping also is effected in such a way that the operation of the machine may be resumed by operation of the manually operable starting button regardless of where the motor and its driven parts are brought to such stop intermediate between the starting position and the normal stopping position.

Other objects and features of the invention will be understood from the description of the drawings to follow in which.

Figure 5:
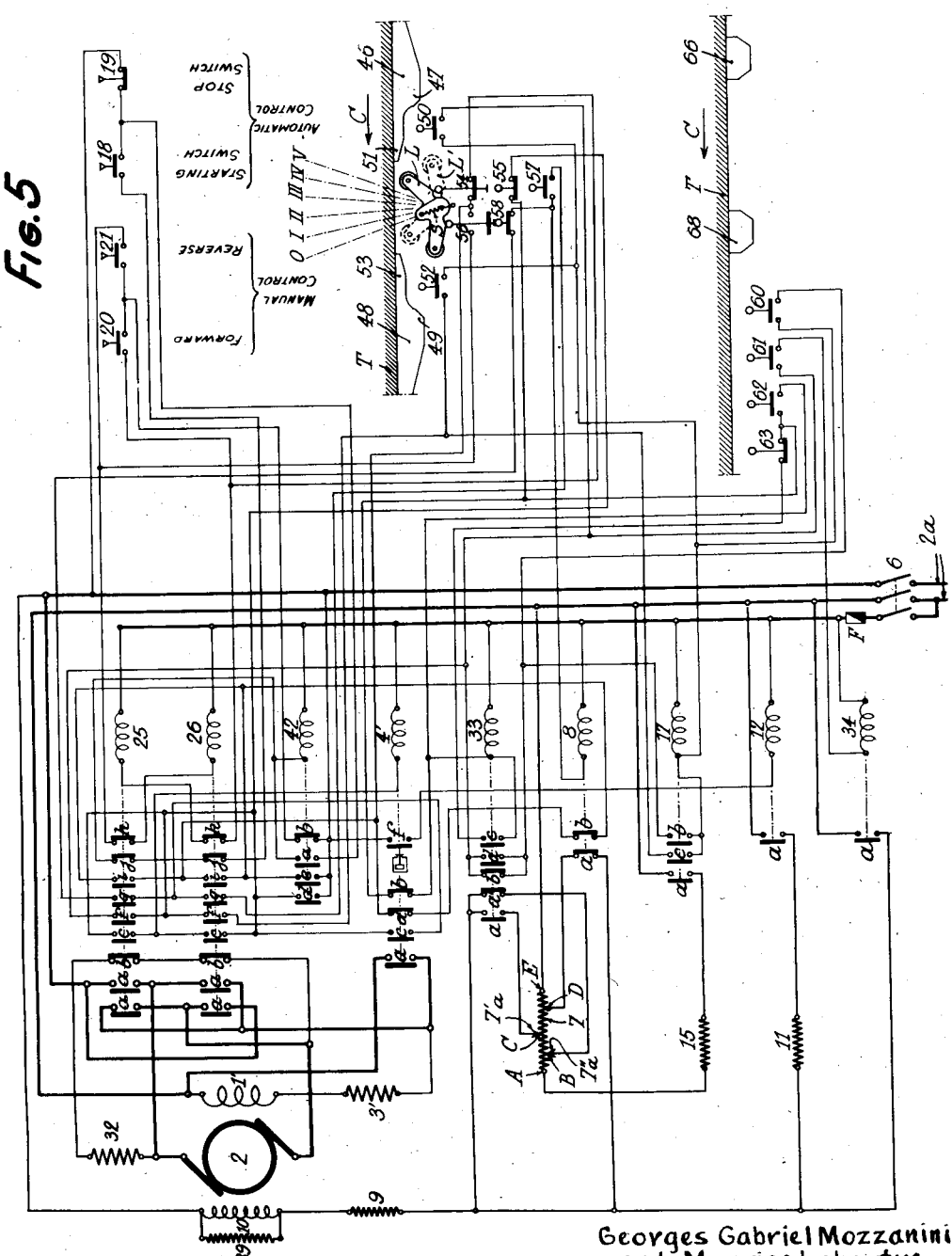
Fig. 5 is a wiring diagram of the electrical apparatus for controlling the speed of a direct current motor by control of its shunt field in accordance with the invention.

Figs. 7 to 12 inclusive show in different successive positions the reversing means and the associated switches shown in Fig. 5 which is operated by the movable member of the machine.

Figure 13:
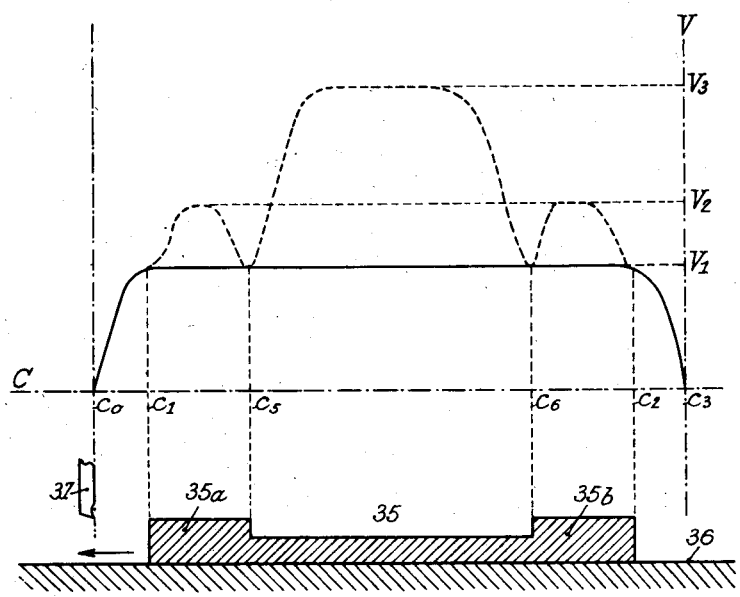

Fig. 13 shows diagrammatically a workpiece mounted on a table for engagement with a cutting tool, the curve in this figure showing the variations in speed which are effected in accordance with the invention for the machining of two raised portions of the workpiece spaced apart in the direction of the travel.

Figure 14:
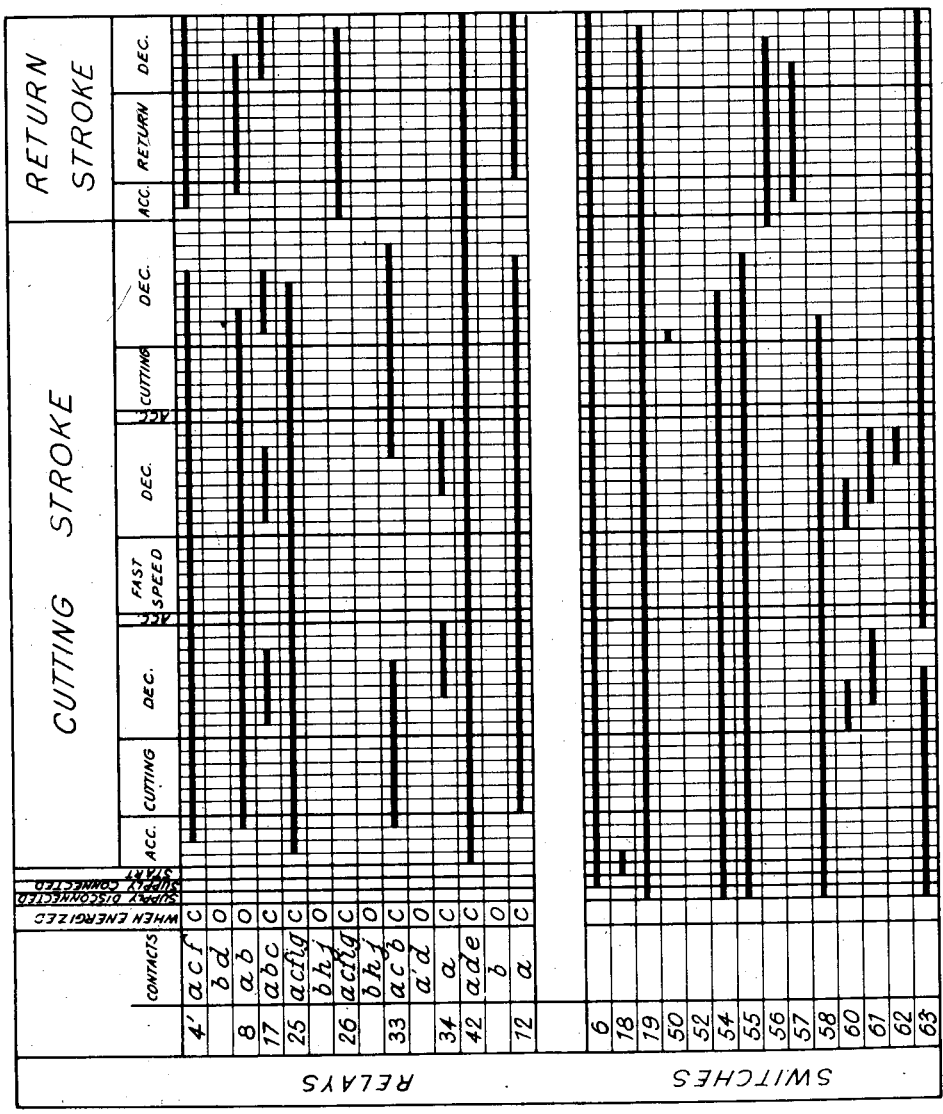

Fig. 14 is a diagram showing the succession of the operation of the different relays and switches shown in Fig. 5 for carrying out the speed variations shown in Fig. 13.

Fig. 15 shows a curve of speed and several accelerations and decelerations of the speed of the motor to and from different operating speeds plotted as ordinates against the travel as abscissae of a member driven by the motor.

Fig. 16 shows the wiring diagram for the auxiliary protective apparatus for stopping the motor.

QUICK ACCELERATION WITH SUPERADJUSTMENT

Figure 1:
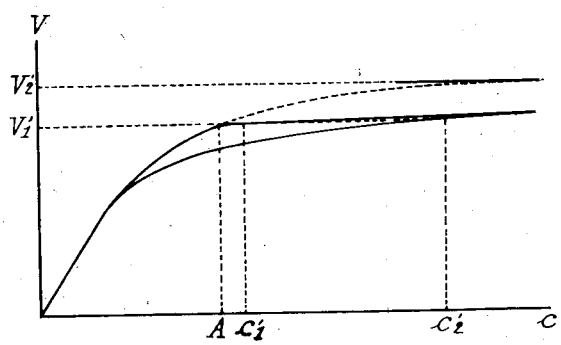
Fig. 1 shows two characteristic speed curves of a motor suitable for acceleration in accordance with the invention in which the ordinates represent the speed of the part driven by the motor proportional to the speed of its rotor and the abscissae represent the travel of the movable part driven thereby.

In Fig. 1 the travel of a movable part driven by an electric motor is represented as abscissae and the corresponding speeds as ordinates. The curve in the thin line shows the acceleration by the conventional method which consists in adjusting, while the motor is starting, the resistance of the rheostat to the value corresponding to the speed at which it is desired to operate the motor, whereas the curve in heavy lines shows the method of bringing the motor up to the desired speed in accordance with the invention in the manner which will now be described.

From this diagram it will be seen that the operating speed $V'_1$ desired to be attained is reached according to the conventional method as shown in the thin line curve only after a movable part has completed its travel to the point $c'_2$. According to the invention the acceleration of the motor is accomplished along the characteristic curve shown by the heavy line which corresponds to a speed $V'_2$ higher than $V'_1$, this acceleration prevailing until the speed has been brought up substantially to the speed $V'_1$. When point A of the travel is reached at which the speed of the motor closely approaches speed $V'_1$, the motor is then controlled in accordance with the superadjustment above generally described to operate so as very shortly thereafter to reach speed $V'_1$ at point $c'_1$ of the travel and to continue operation at this speed. It will be seen that when carrying out the method of the invention, the motor reaches the speed $V'_1$ at point $c'_1$ much sooner than when its speed is increased according to the conventional method, to reach speed $V'_1$ only after travel to the point $c'_2$. The improved acceleration of the motor affords a saving in time for reaching the desired speed represented by the travel from point $c'_1$ to point $c'_2$.

Figure 2:
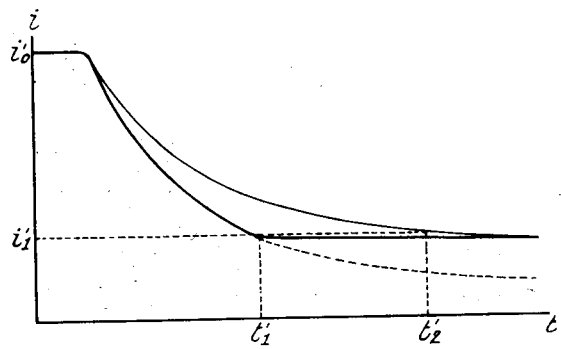
Fig. 2 shows curves of the shunt field excitation current corresponding to the two characteristic speed curves of Fig. 1.

In Fig. 2 time is represented by abscissae and the corresponding values of the excitation current as ordinates. Similarly to Fig. 1, there is shown in the thin line curve the excitation current characteristic according to the conventional method for acceleration of the motor and in the heavy line curve the characteristic according to the superadjustment method of the invention.

According to the conventional method, after the motor has been started under full shunt field excitation, that is to say, at a value produced by the maximum excitation current $i'_0$, as indicated in Fig. 2, the shunt field excitation of the motor is reduced to a value which is produced by the excitation current $i'_1$ which determines the operating speed $V'_1$. Owing, however, to the electric inertia of the circuit the excitation current reaches this value $V'_1$ only after time $t'_2$ as shown in the thin line curve. On the other hand, in accordance with the invention immediately after the motor is started with full shunt field excitation current $i'_0$, it is operated along a characteristic curve which would lead in the same time to a value below $i'_1$ and which would produce a lower excitation of the field to determine a speed $V'_2$ higher than $V'_1$, Fig. 1. Under these conditions it may be seen that the value $i'_1$ of the excitation current is reached along the heavy line curve after a time $t'_1$ which corresponds substantially to point $c'_2$. When the motor reaches a speed near the required speed $V'_1$, the quick acceleration or superadjustment excitation characteristic curve is then abandoned and the motor then continues to run at speed $V'_1$ as determined by the conventional characteristic. The superadjustment thus has accomplished a gain in time represented by the interval between time $t'_2$ and $t'_1$.

DECELERATION WITH PRECISE STOP

As mentioned above the conventional methods for stopping electric motors and for braking thereof are not suitable for precise stopping of the motor and the parts driven thereby, the stopping point varying with the operating speed of the motor. This variation occurs because the kinetic energy stored in the rotor of the motor and in the parts driven thereby is a function of the speed. Under these conditions after braking has been applied to the motor it stops only after rotating an amount dependent on the speed of the motor. That is to say, the faster the motor runs the further the distance the part driven thereby will travel before it stops.

To overcome this disadvantage and to provide precise stopping the invention utilizes at least one preparatory step of deceleration before application of the conventional braking. This step hereafter will be referred to as the first preparation. This preparation is so carried out that the higher the speed at which the motor is running the stronger will be the action brought upon the motor to reduce its speed before braking is applied. This is done with the view to bringing the motor to a reduced speed which is substantially the same and which may approximate the minimum speed of the motor regardless of the operating speed of the motor at the moment the preparatory step is initiated. In this manner the braking is always applied under the same conditions so that this braking action is effective for stopping the driven part very precisely at a predetermined point or after a predetermined amount of travel thereof.

Figure 3:
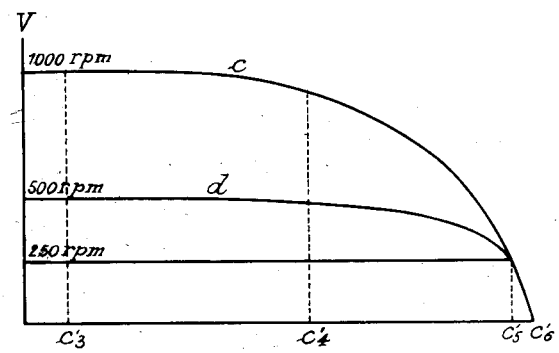
Fig. 3 shows three curves of deceleration of the motor from different operating speeds in accordance with the invention, the ordinates showing the speed and the abscissae showing the travel of a movable part driven by the motor proportional to the rotation of the motor.

Fig. 3 shows three curves of speed as ordinates plotted against the travel of a motor-driven part as abscissae. These curves represent three operating speeds of a motor capable of operating between a minimum operating speed of 250 R. P. M. and a maximum operating speed of 1000 R. P. M. It is desired, for example, to stop the movable part driven by the motor running at 1000 R. P. M. precisely at the point $c'_6$. For this purpose, as soon as the motor-driven part arrives at point $c'_3$ the motor is operated along a characteristic curve $c$ which would lead to a reduced running speed of 460 R. P. M., if the deceleration were allowed to continue along this characteristic, for example. Operation along this characteristic continues as far as the point $c'_4$ and constitutes the step of first preparation of the deceleration. At point $c'_4$ a second preparatory step of deceleration may be initiated which will cause the motor to operate along a speed characteristic which would lead to the minimum operating speed of 250 R. P. M. at the point $c'_5$. As the driven part reaches the point $c'_5$ the supply to the motor is cut off and thereupon conventional braking of the motor is effected. The motor then stops to effect stopping of the driven part precisely at the point $c'_6$.

If under a different condition the motor is running at 500 R. P. M. instead of at 1000 R. P. M. as in the preceding example, when the motor-driven part reaches the point $c'_3$ the first preparation is effected to operate the motor along the characteristic curve $d$ in Fig. 3 which would lead to a reduced speed of 375 R. P. M., that is, one which is above the ultimate reduced speed as in the preceding case if the deceleration were allowed to continue along this characteristic. It will be noted from curves $c$ and $d$, Fig. 3, that the decrease in speed along curve $c$ from point $c'_3$ to point $c'_4$ is much greater than the decrease in speed along the curve $d$ between the same points. In a similar manner as that described in connection with operating the motor at 1000 R. P. M. the second preparatory step is initiated at point $c'_4$ to effect deceleration of the motor along a characteristic which will lead substantially to the minimum operating speed of 250 R. P. M. at the point $c'_5$.

In the ordinary case, where the motor is running at a speed above the minimum operating speed the reduction of speed effected between the points $c'_3$ and $c'_4$ by the "first preparation" is a function of the given operating speed, and the second preparation, therefore, is utilized in order to effect the reduction to a substantially constant speed, namely, the minimum operating speed. This second preparation, however, as will be understood from further description of the apparatus in connection with the drawings, will depend upon the change in the operating speed which was effected in the first preparation. These two preparatory steps, therefore, cooperate regardless of the actual operating speed to effect the deceleration of the motor to a predetermined speed, that is, always substantially the minimum operating speed so that the conventional braking action is always effective to stop the motor withing a given amount of rotation of this rotor after the deceleration is initiated.

Fig. 3 also shows as a horizontal line the minimum operating speed of 250 R. P. M. If the motor is operated at this minimum operating speed, of course, no decelerating effect is necessary and the conventional braking may be applied when the movable part reaches the point $c'_5$ so as to accomplish precise stopping of the motor and this driven part.

Figure 4:
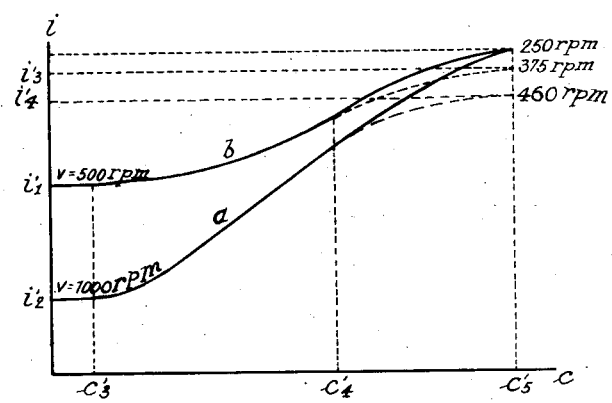
Fig. 4 shows the curves of the shunt field excitation current corresponding respectively to two of the curves of speed in Fig. 3.

Fig. 4 shows the curves of the excitation current plotted against the path of travel of the driven part for the two speeds which have been taken as examples in connection with Fig. 3. It will be noted that when decelerating from the high operating speed of 1000 R. P. M. the increase in the excitation current is effected at a faster rate and the increment is greater between $c'_3$ and $c'_4$ than when the motor is decelerated from 500 R. P. M. This would lead to the higher speed 460 R. P. M., as above mentioned, if this excitation were continued as compared with the speed of 375 R. P. M. when the motor has been operating at 500 R. P. M. Such excitations, however, both are less than the excitation current requisite to produce the minimum speed but are of similar degree at the point $c'_4$. By bringing into effect the second preparation, a change is made at point $c'_4$ in the excitation current again to effect increase thereof for the respective reduced speeds to produce the excitation condition which will produce the minimum speed of 250 R. P. M. at which the braking is applied.

THE BERTHIEZ CYCLE

The Berthiez cycle above referred to will be more clearly understood in the description about to be given of the apparatus and the step-by-step explanation of the acceleration and deceleration which are carried out thereby. In this description, for the most part given in connection with Fig. 5, the Berthiez cycle is carried out with particular reference to the specific form thereof in which the rapid acceleration is utilized to accelerate the motor from the speed $V_1$ taken as the entrance speed of the tool to the speed of $V_2$ taken as the cutting speed. It will be recognized, however, from this description that the devices for effecting deceleration of the motor from the speed $V_2$ to the speed $V_1$ are the same and are operated in the same manner as are effective for deceleration prepatory to stopping of the motor.

The apparatus in the embodiment shown in Fig. 5 provides for rapid acceleration of the motor from speed V₁ by "superadjustment" and for deceleration with the "first preparation" and "second preparation" above referred to for effecting precise stopping and is designed to effect all the changes of speed of the motor to accomplish the machining of the workpiece 35, Fig. 13, having two raised portions 35a and 35b spaced apart in the direction of the stroke, acceleration and deceleration of the motor being effected to provide the three speeds, V₁ shown in Fig. 13 which represents the entrance speed of the tool which in this particular embodiment is taken at the "minimum operating speed" of the motor, V₂ the cutting speed and V₃ the "fast speed" for movement of the tool between the raised portions 35a and 35b. This "fast speed" V₃ also is used for the return stroke.

ELECTRIC SYSTEM AND CONTROL APPARATUS

In Fig. 5 diagrammatically are shown the electrical system and the mechanical devices actuated by the table of a planer for effecting speed control of the shunt field motor in accordance with the invention. In this figure the motor 2 receives power from a supply 2a through a power circuit shown in heavy lines. The system includes means for effecting acceleration, deceleration and reversal of the table selectively by manual operation and by automatic operation. Automatic control is effected through relays 6', 8, 17, 12, 25, 26, 33, 34 and 42, and by various switches which are elements of the control circuit shown in light lines. The main switch 6 is operated by hand simultaneously to connect the power and the control circuits to the supply. Overload and low voltage protection for the motor may be provided by conventional means, not shown. Fuses F are provided in the control circuit. Switches 20 and 21 are used for cutting and return strokes, respectively when it is desired to operate the machine manually. The machine is started in automatic operation by closing manually-operated switch 18. Automatic operation is terminated by opening manually-operated switch 19.

When the planer is in motion reversal is effected at the end of a stroke in the cutting direction by dog 46 which actuates switches 50, 58, 54, 55, 56, 57 in that order, these switches all being biased upwardly in Fig. 5 to open or closed position as the case may be. At the end of the return stroke dog 48 actuates switches 52, 57, 56, 55, 54, 58 in that order. Both dogs 46 and 48 are adjustably mounted on the table of the planer so that the speed changes required may be effected at any desired point in the stroke. Dogs 46 and 48 are respectively formed with depending parts 47 and 49 and with toes 51 and 53.

As shown diagrammatically in Figs. 7 to 12 inclusive switches 54 and 56 are actuated directly respectively by the right hand arm and the left hand arm of reversing lever L by engagement with their vertical stems to urge them downwardly against their bias which may be provided by springs. The stems of switch 55 and 58 are engaged respectively by the downward extensions of switches 54 and 56 to open switch 55 and close switch 58 against their bias suitable gap being provided there between to secure the sequence of opening and closing above given. Similarly the stem of switch 57 is engaged by switch 55 after suitable downward movement thereof to effect closing of switch 57 against its bias.

Switches 50 and 52 are actuated directly by the depending parts 47 and 49 of dogs 46 and 48 shortly before the ends respectively of the cutting and return strokes. Switches 54, 55, 56, 57, 58 are operated through a reversing lever L which rocks about a central pivot during the reversing operation. Upon engagement of the toes 51 and 53 of the dogs 46 and 48 assisted by an overcenter spring S respectively with the right-hand and left-hand arms of lever L, this lever is rocked respectively in the clockwise and counterclockwise directions. During the cutting operation, reversing lever L assumes the position shown in Figs. 5 and 7, the spring S acting to hold the left-hand arm of the lever down and the right-hand arm raised. As dog 46 moves in the cutting direction as indicated by the arrow C, Fig. 5, the depending portion 47 first engages switch 50 and then the toe 51 engages the right-hand arm of the reversing lever L which is rocked in the clockwise direction until it assumes the position L' indicated in dotted lines. The reversing lever L remains in the position L' until the end of the return stroke, when it is rocked in a counterclockwise direction to position L by the toe 53 of the dog 48, the switch 52 in this movement first having been engaged by the depending portion 49 of the dog 48. During the rocking interval at the end of the respective strokes, the cutting stroke relay 25 and the return stroke relay 26 respectively are deenergized and the armature of motor 2 thereby is short-circuited through the braking resistance 32. By the time the reversing lever L has assumed the new position motor 2 has come to a full stop. Either relay 25 or 26, depending upon the position of reversing lever L, then is energized to start motor 2 in the opposite direction.

The switches 60, 61 and 62 are biased upwardly to open position and switch 63 is biased upwardly to closed position and are operated in a predetermined order by dogs 66 and 68 adjustably attached to the planer table to produce the desired acceleration and deceleration at points in the movement of the table between the ends of a stroke. The actuation of these switches effects such changes of speed however, only during automatic operation for cutting stroke.

Switch 60 which is the "first preparation" switch for deceleration is closed by dog 68 or dog 66 and energizes relay 17, thus closing the "first preparation" contact 17a for deceleration and connecting the unused part AC of the rheostat Fig. 5, in parallel with the current-carrying portion CE thereof, so as to have a deceleration effect which is a function of the motor speed as above referred to. Preferably, for practical reasons, a resistance 15 also is connected in series with the unused part AC of the rheostat by the closing of contact 17a.

Switch 61 which is the maximum field excitation switch is closed by dog 68 or dog 66 and energizes relay 34 which closes contact 34a and short circuits the entire composite resistance of the field control circuit. This increases the shunt field excitation to its full strength and decreases the motor speed to the minimum operating speed.

Figure 6:
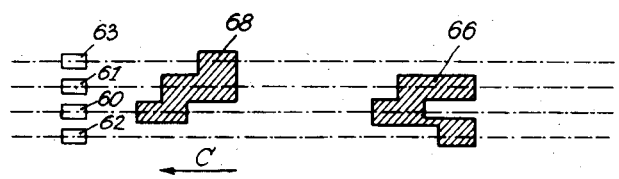
Fig. 6 shows in plan view the arrangement of means actuated by the movable member of the machine tool for operating certain switches shown in Fig. 5.

Switch 63 which is a "fast speed" switch is opened by dog 68, Fig. 6, thus deenergizing relay 33. The deenergization of relay 33 has the effect of shifting the field excitation current from slider 7'a which has caused the motor 2 to run at cutting speed to slider 7''a to connect in series with the shunt field a higher resistance to cause motor 2 to run at "fast speed" by the opening of contact 33a and closing of contact 33a'.

Switch 62 which is a cutting speed switch is closed by dog 66 to energize relay 33. The energization of relay 33 has the effect of shifting the field excitation current from slider 1''a, which causes motor 2 to run at "fast speed" to slider 1'a which causes motor 2 to run at cutting speed.

The selective operation of switches 63, 62, 61 and 60 by dogs 68 and 66 may be accomplished in any desired manner by suitably forming the dogs and arranging the switches relative to the path of their travel with the table. In the particular arrangement illustrated in Fig. 6 the switches 61 and 60 are placed in a middle path and are actuated by both dogs 68 and 66, while the switch 63 is in the path of dog 68 only and the switch 62 is in the path of dog 66 only.

The functions of the nine relays mentioned above are briefly as follows:

Relay 4' is provided to short-circuit the series field 1' through closed contact 4'a at all times except when effecting acceleration from standstill in which case relay 4' is deenergized for a short period and contact 4'a opened so that series field 1' may provide extra starting torque.

Relay 8 is an intermediate speed relay which is deenergized shortly before each reversal in order to short circuit most of the variable shunt field resistance and thereby limit the speed of motor 2. It is again energized shortly after reversal to remove this short circuit and make available the resistance of the rheostat as determined by sliders 1'a and 1''a. It is energized by the action of the reversing lever and switches 57 and 58 to provide exit and entering speeds at each reversal and its special purpose will be explained hereinafter.

Relay 17 is a "first preparation" relay for paralleling the unused portion of the rheostat with the current-carrying portion, the resistance 15 being in series with this unused portion, effect the change in inverse relation to the running speed as referred to above. This relay is energized by switch 60 when changes in speed are required to be effected between reversals or by switches 50 and 52 respectively at the reversals.

Relay 12 is the superadjustment relay connecting resistance 11 across the current carrying portion of the rheostat.

Relay 25 is the forward or cutting stroke relay which connects the control circuit for cutting stroke operation of the motor.

Relay 26 is a return stroke relay which connects the control circuit for return stroke operation of the motor.

Relay 33 when energized connects the rheostat slider 1'a for forward or cutting speed operation and when deenergized connects the slider 1''a for "fast" speed operation of the motor. This relay is energized by either switch 63 or switch 62 actuated respectively by dogs 68 and 66.

Relay 34 is the maximum field excitation relay. It is energized through switch 61 actuated during a stroke in one direction or the other by dogs 68 and 66 in order to short circuit resistances 7 and 15, thereby causing motor 2 to decelerate down to the tool exit and tool entrance speed, that is the minimum operating speed in the case being described. This relay, like switches 63, 62, 61 and 60, is employed, for example, for deceleration when two or more work surfaces are cut in one cutting stroke.

Relay 42 is the automatic operation relay and is effective for insuring that the automatic operation once it is initiated is completed for the cycle of steps as determined by the dogs carried by the reciprocating table of the planer without possibility of interference by manual operation. This relay when deenergized also insures that automatic operation may not be initiated if manual operation has been initiated until the motor is stopped. In either case the motor may be stopped at will by operation of the stop push button.

In the apparatus of Fig. 5, while other contacts are operated by these relays to establish interlocking to prevent interference and for holding the relays energized and for other purposes the significant contacts utilized for acceleration, deceleration, the Berthiez cycle and for cutting and fast speeds are as follows:

To carry out the improved acceleration method of the invention contact 12a and resistance 11 are utilized to produce the super adjustment in cooperation with relays 4', 25 or 26, 12, 42 and push button 18.

To carry out the deceleration method of the invention in its three significant steps the following resistances and contacts are used.

Step I.—Contact 17a and resistance 15 are connected in the excitation circuit by energization of relay 17 either at the end of a stroke, that is, by the closing of switch 50 by dog 46 at the end of the cutting stroke, or by the closing of switch 52 at the end of a return stroke. When such deceleration is to be effected in the course of a stroke without further deceleration to stop switch 60 is effective to energize relay 17 to close contact 17a.

Step II.—When the deceleration is to be effected to bring the table to a stop at the end of a stroke, contact 8a is operated to short circuit the major part of the rheostat by closing switch 58 at the end of a cutting stroke or switch 57 at the end of a return stroke. When the deceleration is to be effected in the course of a stroke, contact 34a is closed to short circuit the rheostat, relay 34 being energized by closing of switch 61 by dog 68 or 66.

Step III.—In this step conventional braking of the motor is carried out by first disconnecting the motor from the supply and then connecting it in parallel across a braking resistance. This conventional braking, however, is only effected after the completion of Steps I and II to reduce the speed of the motor to the minimum operating speed $V_1$.

The braking effect is effective therefore to stop the motor and the driven part precisely at the same point in the travel regardless of the value of the operating speed from which the deceleration was initiated.

To carry out the method of the Berthiez cycle when the tool enters the workpiece at the minimum speed $V_1$ contact 8a is closed. After the tool enters the workpiece contact 8a is opened and the tool is brought up to the cutting speed $V_2$ relative to the workpiece by virtue of the slider 1'a now being connected in the shunt field circuit. The cutting stroke then is completed but before the exit of the tool from the workpiece the cutting speed is reduced by the deceleration method above described, that is, by the operation of relays 17 and 34 controlled by switches.

Various combinations of speeds may be effected merely by setting the dogs 66 and 68 at suitable positions along the table and by forming these dogs so as to operate the switches 60, 61, 62, 63 in the proper order. These variations of speed may be accomplished for the return stroke as well as for successive cuts in the same direction which may be spaced apart so that the fast speed $V_3$ higher than the cutting speed may be used. For such higher speeds a second slider $7''a$ is used and connected into the excitation circuit through contact $33a'$ actuated by relay 33, this relay 33 being energized either by switch 63 or 62.

OPERATING SEQUENCE OF THE CONTROL APPARATUS

The step by step operation of the above disclosed apparatus will now be given for a typical operating cycle or series of steps in which automatic operation of a planing machine for machining a workpiece as shown in Fig. 13 is accomplished by cutting in one direction followed by a quick return movement. In the movement of the workpiece toward the left as shown by the arrow in Fig. 13, the tool in effect moves relative to the workpiece toward the right and the ordinates of the curves shown in Fig. 13 represent the speeds at different points during the movement of the tool over the workpiece. This forward movement of the workpiece, that is, in the cutting direction relative to the tool, comprises in succession starting of the table carrying the workpiece to bring the workpiece into engagement with the tool at the entrance speed $V_1$, acceleration after the tool has entered the workpiece up to the cutting speed $V_2$, first cutting stroke at speed $V_2$, deceleration to the speed $V_1$ for exit of the tool from the workpiece, acceleration to the fast speed $V_3$ between cuts, operation at the fast speed $V_3$, deceleration to the entrance speed $V_1$ for the second cut, acceleration after the tool has entered the workpiece to cutting speed $V_2$, second cutting stroke at speed $V_2$, deceleration to the speed $V_1$ for exit of the tool from the workpiece and further deceleration to accurate stop. The return movement of the workpiece may comprise acceleration to the fast speed, return stroke at the fast speed and deceleration to accurate stop.

A. AUTOMATIC OPERATION

The table rocker L is assumed to be in the position corresponding to the forward or "cutting" direction, i. e. that shown full lines in Fig. 5.

The main power switch 6 is first closed by hand, thus applying potential to the device for adjusting the voltage of shunt winding 10 of the motor, which device comprises rheostat 7 and its associated sliders, resistances and contacts.

The push button 18 for starting automatic operation is then depressed, thus energizing the relay 42 through the contact elements of the stop push button 19 and both contacts 25j and 26j which are closed as relays 25 and 26 are not yet energized. No further manual operation is necessary and the operating cycle or series of steps about to be described thereafter is automatically completed and this operating cycle continuously repeated until stop push button 19 is depressed.

1. Operation in the Forward Direction

*(a) Starting and control to attain cutting speed*

The energization of relay 42 brings about the closing of its holding contact 42a. Starting button 18 then may be released and relay 42 remains energized through this holding contact 42a. Energization of relay 42 also closes contact 42e, thus energizing relay 25 through a circuit comprising this contact 42e, closed contacts 8b and 4'd (relays 8 and 4' not yet being energized), direction controlling switch 54 and closed contact 26h (relay 26 not being energized). Motor 2 is started due to the energization of relay 25 and consequent closing of contacts 25a to complete the circuit to the armature through the series field 1' and its resistor 3'. Energization of relay 25 also opens contact 25b to remove the short circuit upon the armature through the braking resistance 32. The table now begins to move in the direction of the arrow in Fig. 13.

Energization of relay 42 also causes energization of relay 33 through a circuit comprising contacts 42d, switch 55 which is closed when the table is moving in the forward or cutting direction toward the left in Fig. 13, and closed contact 4'b (relay 4' not yet being energized). Energization of relay 33 closes contact 33a which connects across the supply the shunt field energizing circuit of the motor so as to include a part of the rheostat 7 defined by the position of slider 7'a. Holding contact 33c is closed upon energization of relay 33, this contact 33c being in circuit with switch 63 which is normally closed until opened by the dog 68 hereafter described, closed switch 55 and the closed contact 42d. During these initial steps of the cycle or series of steps which so far have been described contact 12a is open, relay 12 not yet being energized because of the delay in the closing of the time contact 4'f as hereafter explained. Since contact 12a is open, resistance 11 is not yet connected across the right-hand or current-carrying portion of resistance 7 of the rheostat, so that the shunt field current is small and a quick rise of speed is thereby secured, this constituting the so-called "super-adjustment." In order to have a strong starting torque the lack of flux due to the higher resistance of the current carrying portion of the rheostat 7 is compensated by the series field 1' which is energized upon closing the contacts 25a upon energization of the relay 25.

The energization of relay 25 effects closing of the contact 25c, this contact being in circuit through the contact 42d of relay 42 with the relay 4' across the supply and effecting energization of relay 4'. Energization of relay 4' closes contact 4'a which short-circuits the series field winding 1' and its resistor 3'. The energization of relay 4' also closes contact 4'c, thus energizing relay 8 through a circuit comprising contact 42d, 4'c, 25g and 58 and effecting opening of contact 8a up to now closed to provide a strong shunt field current through a small portion DE only of the rheostat at starting. The reason for providing portion DE will be explained hereafter. The energization of relay 4' also closes the time delay contact 4'f and thereby effects the requisite delayed energization of relay 12 to secure delayed closing of contact 12a to connect resistance 11 in parallel with the current carrying portion of the rheostat 7, that is, eliminating the so-called "super-adjustment" which has determined acceleration of the motor along the characteristic curve leading to the high speed corresponding to the portion CE of the rheostat which at this moment is in circuit. The connecting of the resistance 11 in parallel with the operating or current-carrying portion of the rheostat the resistance of which is determined by the position of the slider 7'a, determines a given value of the shunt field excitation of the motor corresponding to the desired cutting speed as determined by the position of the slider and the ohmic value of the resistance 11. It should be noted that the energization of relays 8 and 33 are effected substantially simultaneously by virtue of the energization of relay 4' so as to change the current carrying portion of the rheostat from portion DE to portion CE.

Upon completion of the operation of the relays and the closing of the respective contacts and circuits as above described, the table will have been brought up to the cutting speed $V_2$ as shown by the dotted portion of the curve above the portion 35a of the workpiece 35. The table will continue to move at this cutting speed until the dog 68 actuates the switches 60, 61, 63 as will now be described.

(b) *Passing from cutting speed to fast speed*

As the workpiece is moved forward at cutting speed so that the tool approaches point $c_5$, Fig. 13, and before the tool leaves the workpiece, the speed is reduced in accordance with the Berthiez cycle.

For this purpose the dog or cam member 68 (Figs. 5 and 6) which is adjustably secured to the table has been set to operate switch 60 to close this switch somewhat before the exit of the tool from the portion 35a of the workpiece thus energizing relay 17 through a circuit comprising contacts 42d, 25f, 33b and switch 60. Energization of relay 17 is maintained by holding contact 17b after the dog 68 clears switch 60 and this switch again is opened under its bias. The energization of relay 17 causes first field preparation contact 17a to close, thus connecting resistor 15 in series with the normally non-current-carrying portion AC of the rheostat 7 when the slider 7'a of this rheostat is positioned at a point intermediate the ends of the resistance 7. The resistor 15 and the portion AC of the rheostat connected in series with each other are also connected as a whole in parallel across the current-carrying portion CE of the rheostat. The motor field excitation thereby is increased and deceleration of the motor is effected.

It will be noted from a consideration of Fig. 5 that the amount of resistance of the rheostat represented by the portion AC thereof which is connected in parallel with the portion CE of the rheostat by the closing of the contact 17a is the remainder or normally non-current-carrying portion which is the complementary fraction of the whole resistance of the rheostat in comparison with the fraction thereof which is used and which carries the excitation current.

It will be understood when the motor is running at high speed and the slider 7'a is adjacent the end A of the rheostat that the amount of resistance of the remainder which is connected in parallel with the current-carrying portion of the rheostat is small, and, therefore, the connection effected by the contact 17a produces a marked change in the composite resistance which is in series with the shunt field 10. This marked change in the excitation is effective to reduce the speed of the motor from such high speed substantially to the requisite reduced speed. This requisite reduced speed will be one which is lower than the speed to which the motor would be reduced if it were allowed to coast to stop the current supply being cut off. It would also be one which is in a predetermined relation to the motor speed from which it was reduced and such reduced speed might not be obtained easily by the mere operation of the slider of the rheostat.

This reduced speed, therefore, may be selected at a point on the curve of speed plotted against accumulated revolutions of the motor or displacement of the machine tool table as, for example, shown in Fig. 4 and Fig. 13, such that further reduction of the speed in the manner hereafter described in the step of so-called second field preparation may be accomplished for the purpose of arriving at the minimum continuous operating speed $V_1$ at a point precisely located along the workpiece, so that entrance of the tool or exit thereof may be effected at this minimum speed. From this minimum speed the motor may again be accelerated to a higher speed, for example, $V_3$, or if desired the motor and the table may be brought to a stop at a precisely determined point of the stroke of the table, for example, at a precise distance from the point where the tool exits from the workpiece.

It will be understood that when the motor is running at a relatively low speed, that is, when the slider 7'a is adjacent the end E of the rheostat, the connection in parallel of the large remainder portion of the rheostat is of slight effect further to reduce the speed because the used or current-carrying portion of the rheostat under these conditions is of low resistance to provide the high excitation current for the low operating speed. Under these conditions only slight change in the excitation is necessary to produce the lower speed because the kinetic energy of the rotor and all parts driven by the motor is relatively small, and the requisite reduced speed may be attained without marked change, as was the case when the motor was running at the high speed. Nevertheless, in the same manner as described in connection with the reduction of speed when the motor was running at a high speed, further reduction of the speed may be accomplished for the purpose of arriving at the minimum continuous operating speed to permit entrance of the tool into the workpiece or exit thereof from the workpiece or to provide for precise stopping of the table.

It is to be noted that if reduction in speed from any given running speed of the motor were attempted by moving the slider 7'a of the rheostat in a conventional manner from the point thereon corresponding to the running speed, it would be necessary to move the slider to a point on the rheostat which would require determination depending upon the particular running speed, each running speed requiring a different predetermined point to which the slider would be moved. As the table of the machine tool driven by the motor is repeatedly reciprocated, such movement of the slider would be required for each reversal of the direction of the movement of the table. Movement of the slider also would be required to bring the motor to minimum speed. In machining a workpiece such as is shown in Fig. 13 such movements of the slider would be required for the machining of each of the elevated portions 35a and 35b if the speed changes corresponding to the curve of Fig. 13 were to be secured, as well as for the reversal of the table at each end of its stroke.

In order to avoid a too-sudden increase in the excitation when the slider is adjacent the point A of the rheostat for operation at a high running speed upon closing of the contact 17a, the resistance 15 in suitable amount is provided in series with the complementary portion of the rheostat.

The switch 61 is arranged to be engaged by the dog 68 after the switch 60 has been operated by this dog to establish the first field preparation as above described, the switch 61 being closed by the dog 68 in the movement of the table in the cutting direction. Closing of the switch 61 energizes relay 34, this switch being connected in a circuit which comprises the relay 34 and closed contacts 25f and 42d. Energization of the relay 34 closes contact 34a, thus short-circuiting the superadjustment resistance 11 and as well the whole assembly of parallely arranged resistances 7 and 15 in the excitation circuit. Such short circuiting produces the full excitation of the shunt field 10 of the motor and the motor thereupon attains its minimum speed. As the table thus continues its movement in the cutting direction the dog 68 clears switch 60 which thereupon opens under its bias. Relay 17, however, remains energized through its holding contact 17b and through closed contacts 33b, 25f and 42d. This condition of the circuit is maintained in order that for the attainment of the fast speed the change of the setting of the rheostat, that is, by connecting the slider 7"a in the circuit, may be accomplished as now will be described before the composite resistance connected in series with the shunt field is changed.

The dog 68 after passing the switch 61 engages the switch 63 as shown in Fig. 6, without operating switch 62 since 62 is not positioned in the path of movement of the dog 68. Opening of switch 63 deenergizes relay 33, this switch being connected in a circuit which comprises the relay 33, holding contact 33c, switch 55 and closed contact 42d. Deenergization of the relay 33 also opens the cutting speed contact 33a and closes the fast speed contact 33a', thus connecting the slider 7"a in series with the shunt field circuit. This connection increases the resistance of the current-carrying portion BE of the rheostat 7, the slider 7"a being set at B to the left of the slider 7'a now disconnected, set at C in Fig. 5. The closing of the contact 33a', however, does not as yet effect a change in the equivalent resistance connected in series with the shunt field circuit, since the contact 34a remains closed to maintain the short-circuit across the rheostat and the associated resistances 11 and 15. Deenergization of the relay 33 also opens contact 33d, thereby deenergizing relay 17 and opening contact 17a. Opening of this contact 17a disconnects the resistance 15 from its connection in series with the non-current-carrying portion of the rheostat which was utilized for the first preparation for deceleration, and makes effective the slider 7"a to connect in the shunt field circuit the portion of the rheostat BE as the current-carrying portion thereof, subject, however, to the opening of the contact 34a to remove the short-circuit above referred to.

Opening of the contact 34a is accomplished by deenergization of the relay 34, and this deenergization is effected when the dog 68 having passed the switch 61 releases this switch to open under its bias and then dog 68 engages the switch 63 to open the holding circuit connected through contact 33c of the relay 33 through switch 55 and contact 42d. Opening of the contact 34a reduces the excitation of the shunt field from the maximum provided by short-circuiting of the composite resistance to the value determined by the position of the slider 7"a thus establishing the current-carrying portion BE of the rheostat for fast speed operation, since all contacts 34a, 12a, 17a and 8a are open. By suitably position- ing the dog 68 along the table and fastening it in this position the switches 60, 61 and 63 may be engaged for carrying out the deceleration and the subsequent acceleration to fast speed as the tool approaches the end of the cut in relation to the raised portion 34a of the workpiece and leaves this raised portion to pass over the depressed portion as shown in Fig. 13, the workpiece moving relative to the tool over this depressed portion at the fast speed. As dog 68 passes over switch 63 it releases this switch to close under its bias. Since contact 4'b is open because of relay 4' being energized and contact 33c is open because of the deenergization of relay 33 as above mentioned, relay 33 cannot again be energized by such closing of the switch 63. This prevents the restoration of the condition for attainment of the cutting speed which would be produced if relay 33 were allowed to be energized to close contact 33a and open contact 33a'. Therefore, the fast speed is maintained for as long a travel of the table as is required until the workpiece is moved so that the tool approaches the raised portion 35b.

(c) *Passage from fast speed to cutting speed*

As the tool approaches the raised portion 35b the table must be decelerated in order to reach the minimum continuous operating speed $V_1$ suitable for entrance of the tool into the workpiece in accordance with the Berthiez cycle. For this purpose, a dog 66, Figs. 5 and 6, similar to the dog 68 and adjustably secured to the table is arranged so that it will engage switch 60 and again close this switch. Relay 17 thereby is energized through contacts 25f and 33d, both of which are still closed. First preparation contact 17a thereby is closed as a result of the energization of relay 17. As the dog 66 continues movement with the table it then engages switch 61 and again closes this switch. Relay 34 is thereby energized through the contacts 25f and 42d which also have remained closed. Maximum field excitation contact 34a is closed by the energization of relay 34 and the motor runs at its minimum continuous operating speed $V_1$ in the same manner as above described. When the dog 66 passes clear of the switch 60 this switch is opened, but the relay 17 remains energized through its holding contact 17b. As the table continues movement the tool now is brought to the position of entering the workpiece at its minimum speed $V_1$. As the table moves the workpiece forward the dog 66 is brought into engagement with the switch 62 and closes this switch, thus again energizing the relay 33 to close contact 33a to open contact 33a' to connect the slider 7'a in the shunt field circuit so as to utilize the portion CE of the rheostat for cutting speed $V_2$ instead of the portion BE for the fast speed. Energization of the relay 33 also opens contact 33b and deenergization of the relay 17 is thereby effected, the holding contact 17b of relay 17 being connected in series with the contacts 33b, 25f and 42d. First preparation contact 17a thereupon is opened to remove the resistance 15 from its parallel connection with the rheostat and to make effective the whole of the portion CE of the rheostat for the cutting speed.

As dog 66 has now passed over switches 61 and 62 these switches open under their bias. Opening of the switch 61 produces deenergization of the relay 34 and opening of the maximum excitation contact 34a to remove the short circuit so as to make effective the changes in the connections just described and make available the resistance CE for the cutting speed $V_2$. All contacts 34a, 12a and 8a are now open and the motor drives the table at the cutting speed determined by the position of slider 7'a.

*(d) Deceleration and braking with accurate stop before reversing*

The tool now approaches the point of exit from the raised portion 35b and the table must be decelerated to the minimum speed $V_1$ for exit of the tool from the workpiece in accordance with the Berthiez cycle, and thereafter must be brought to a stop.

Shortly before the end of the cutting stroke of the table dog 46, Fig. 5, closes switch 50 through a circuit comprising closed contacts 25f and 42d, thus energizing relay 17, the first field preparation contact 17a thereby being closed.

The switch 50 is positioned in relation to the reversing lever L so that the depending portion of the dog 46 engages switch 50 before the toe of this dog engages reversing lever L. As the table continues its movement this depending portion of the dog 46 passes over the switch 50 and this switch opens under its bias. The relay 17, however, will remain energized by its holding contact 17b and the first field preparation is thereby maintained.

Figure 8:
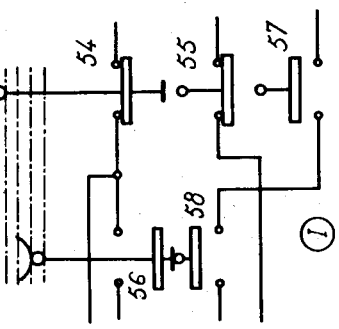
Figure 7:
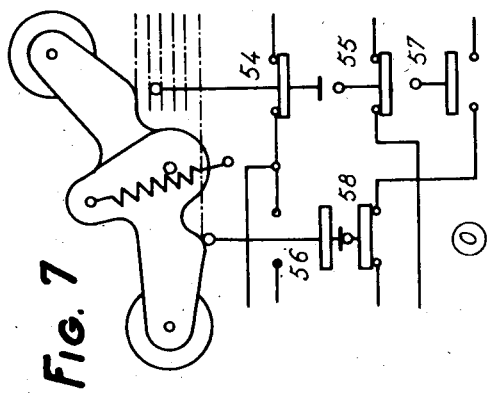
Figure 12:
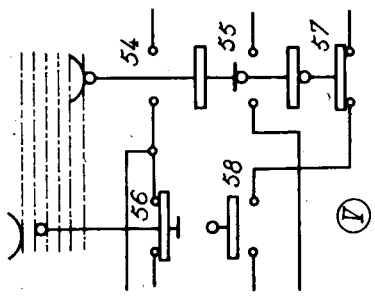

As the toe of the dog 46 engages the reversing lever L it will start to rock this lever in the clockwise direction, Figs. 5 and 7. The left-hand arm of this lever which has held the switch 58 closed during the whole cutting stroke now allows this switch to open under its bias as shown in Fig. 7 as the axis of symmetry of the reversing lever L passes from 0 to I, Fig. 5. During this movement the right-hand arm of the lever L moves from 0 to I as shown in Fig. 8 and into engagement with but does not yet operate switch 54. The opening of switch 58 deenergizes relay 8, closing contact 8a to short circuit the part CD of the current-carrying portion CE of the rheostat, leaving, however, a substantial part DE of this portion CE in the shunt field excitation circuit of the motor. The effect of the operation in succession of contacts 17a and 8a is similar to the effect of the successive operation of contacts 17a and 34a, as above described, for reducing the speed from the cutting speed $V_2$ to one suitable for exit of the tool from the workpiece which may approximate the minimum continuous operating speed $V_1$. By allowing the part DE of the rheostat to remain in circuit, however, a condition of less excitation of the field will be provided so as to produce a quicker acceleration after the motor has stopped and been reversed.

Figure 9:
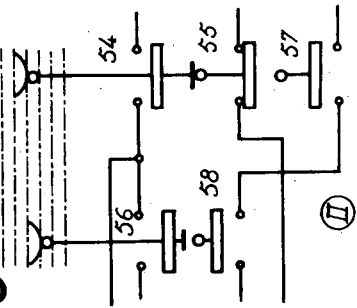

The dog 46, continuing to move the reversing lever L from I to II, next opens switch 54, Figs. 5 and 9, thus deenergizing relay 25 to open contacts 25a and to close contact 25b. Opening of contacts 25a cuts off the supply to the armature of the motor 2. Closing of the contact 25b connects the armature across the braking resistance 32 through a circuit comprising also closed contact 25b. The form of dog 46 and the construction and arrangement in relation thereto of the reversing lever and the switches operated by this dog and this lever are such that the opening of the contacts 25a to deenergize the motor and the closing of contact 25b to brake the motor are effected at the proper reduced speed as determined by the successive operation of contacts 17a and 8a to bring the motor and the table to stop at a precise point after the exit of the tool from the workpiece regardless of the actual speed from which the reduction in speed for stopping was started, that is, the cutting speed $V_2$ in the particular case shown in Fig. 13.

*(e) Conditioning of field circuit for the return stroke*

The deenergization of the relay 25 opens contact 25c, thus deenergizing the relay 4', thereby opening the contacts 4'a and 4'f. Opening of contact 4'a removes the short circuit from the series field and conditions it for the starting of the motor in the reverse direction. Opening of contact 4'f deenergizes relay 12, thus opening super-adjustment contact 12a so as to condition the shunt field excitation circuit with the high resistance of the portion BE of the rheostat in series with the shunt field winding 10 for this reverse or return stroke operation, subject, however, to subsequent opening of contact 8a after the motor is started.

Figure 10:
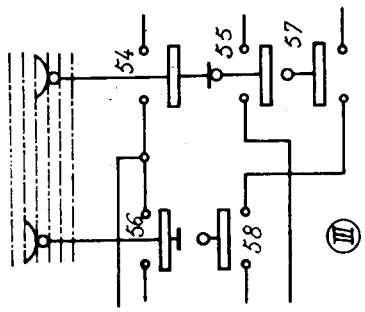

Further rocking movement of lever L under the action of spring S continues from position II, Fig. 9, to position III, Fig. 10, to open switch 55 by the action of the right hand arm of this lever transmitted through switch 54. Opening of switch 55 deenergizes relay 33, thus opening contact 33a and closing contact 33a' so as to effect change from the slider 7'a for the cutting direction to slider 7'a for the return stroke of the table.

2. RETURN STROKE

*(a) Starting and running at fast speed*

Figure 11:
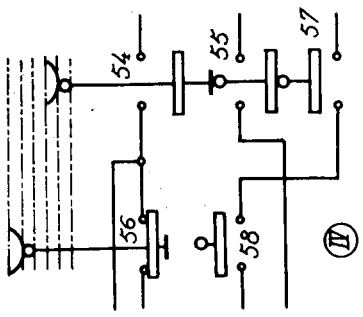

The continuation of the rotation of lever L to position IV, Figs. 5 and 11, closes switch 56 under its bias as the left hand arm of lever L is raised, thus energizing relay 26 through a circuit comprising contacts 25h, 56, 4'd, 8b and 42e. Energization of relay 26 closes contacts 26a, also opening contact 26b to remove the short circuit of the armature through braking resistance 32. The motor starts in the return stroke direction.

The energization of relay 26 also closes contact 26c thus energizing relay 4'. Contact 4'a thereby is closed and short circuits the series field winding 1'.

As the reversing lever L reaches the end of its rocking movement the right hand arm thereof closes contact 57 (position V in Fig. 12) and relay 8 is energized through a circuit comprising closed switch 57 and closed contacts 26g, 4'c and 42d. Contact 8a thereupon opens and the motor rotates at the fast speed determined by the position of slider 7"a of the rheostat and drives the table of the planing machine in its return stroke at the fast speed $V_3$.

*(b) Deceleration and braking with accurate stop before reversing*

When the table approaches the end of its return stroke the depending portion of dog 48, similar to dog 46, closes switch 52, thus energizing relay 17 through a circuit comprising switch 52 and closed contacts 26f and 42d. The first field preparation contact 17a thereby is closed for controlling the deceleration. When dog 48 has cleared switch 52 the latter opens again but relay 17 remains energized through its holding contact 17c.

The toe of dog 48 then engages the left hand arm of reversing lever L and beings rocking of this lever in the counterclockwise direction. Switch 57 is first opened by the lifting of the right hand arm of lever L moving from position V, Fig. 12, to position IV, Fig. 11, thus deenergizing relay 8 and closing contact 8a to decelerate the motor in the manner described for the cutting stroke.

With continued movement of the lever L from position IV, Fig. 11, to position III, Fig. 10, switch 56 is opened by the left hand arm of lever L and relay 26 is deenergized. Contacts 26a thereby are opened and contact 26b is closed and the motor is disconnected from the supply and its armature short circuited through contacts 25b and 26b and braking resistance 32. The motor stops and stops the table at a point precisely determined by the position of the dog 48 along the table. Contact 26c also opens and deenergizes relay 4' to open contact 4'a and remove the short circuit of the series winding 1'. This winding 1' remains inoperative since the motor circuit is cut at 26a. The deenergization of the relay 26 opens contact 26f and deenergizes relay 17, thus opening the first preparation contact 17a for the deceleration. With continued movement of lever L from position III, Fig. 10, to position II, Fig. 9, under the action of the spring S, the right hand arm of the lever L raises to allow switch 55 to close under its bias. Relay 33 thereby is energized through a circuit comprising contacts 4'b, switch 55 and 42d. Contact 33a thereby is closed to connect the slider 7'a in the shunt field excitation circuit in preparation for the next cutting stroke. The return stroke is ended.

3. Resumption of Movement in Cutting Direction After Return Stroke

In order automatically to effect reversal of the table from its movement in the return stroke to movement in a second cutting stroke further rocking movement of lever L is effected under the action of the spring S from position II, Fig. 9, to position I, Fig. 8. In such movement switch 54 closes under its bias upon further lifting of right hand arm of lever L. Relay 25 is thereby energized through a circuit comprising closed contact 26h, switch 54, closed contacts 4'd, 8b and 42e, thus closing contacts 25a and starting the motor in the cutting direction as well as energizing relay 4' through contact 25c. Contact 4'a thereupon is closed for short circuiting the series field winding 1'.

The rocking movement of reversing lever L continues under the action of the spring from position I, Fig. 8, to position 0, Fig. 7, thus closing switch 58 for energizing relay 8 through a circuit compirsing switch 58 and closed contacts 25g, 4'c and 42d. Contact 8a thereupon is opened and the motor is brought to the cutting speed $V_2$ determined by the position of slider 7'a. The series of steps in the operation for the cutting and return strokes then proceeds in the manner above described.

4. Stopping of the Automatic Operation

For stopping the machine it is only necessary to press the stopping button 19, thus deenergizing the automatic operating relay 42 and opening the contact 42e. This brings about the deenergization of relay 25 the contacts 25a of which connect the motor with the supply. Series field short circuiting contact 4'a thereupon opens due to the deenergization of the relay 4' caused by the opening of contact 25c. All relays are now deenergized and all contacts are restored to their original positions as shown in Fig. 5 from which they may be actuated by again closing the automatic starting push button 18 or by the manual operation about to be described.

B. MANUAL OPERATION

In manual operation the machine always runs at a low speed for as long as either one of the two push button switches 20 or 21 is closed. As soon as the switch is released the machine stops.

For moving the table in the cutting direction push button switch 20 is closed to energize relay 25 through a circuit comprising contact 26h, switch 20 and contact 42b. Starting contact 4'a is closed upon energization of the relay 4' effected by the closing of contact 25c by the energization of relay 25. As long as switch 20 is closed the machine operates in the cutting direction at a slow speed somewhat above the minimum operating speed $V_1$ as determined by the current-carrying portion DE of the rheostat, since contact 8a is closed due to the relay 8 being deenergized, contact 42d being open as automatic operation relay 42 is deenergized.

For stopping the machine push button switch 20 is released, thus deenergizing relay 25 and opening contact 25a to disconnect the motor from the supply and braking it through resistance 32.

For moving the table in its return stroke with manual control, push button switch 21 is closed and in a similar manner as for switch 20 the motor is driven in the reverse direction by energization of relay 26 through a circuit comprising closed contact 25h, switch 21 and contact 42b. The table continues to move at a slow speed somewhat above the minimum operating speed $V_1$ determined by the portion DE of the rheostat, as long as the switch 21 is held closed. When this switch is released to open under its bias the machine stops.

It may be noted that both for automatic as well as for manual operation field winding 10 of the motor remains connected across the supply as long as switch 6 is in its closed position. To disconnect this winding from the supply the switch 6 must be opened.

Fig. 14 shows a diagram in which in the upper part the horizontally extending spaces represent respectively the relays 4', 8, 17, 25, 26, 33, 34 and 42 which become energized in the operation described in connection with Fig. 13. The spaces between the vertical lines represent arbitrary successive time intervals which may be of equal or unequal value starting from the time of connecting the system of Fig. 5 to the supply. The lengths of the horizontal heavy lines drawn in the horizontally extending spaces show the intervals during which the respective relays are closed. At the head of the diagram the successive periods and changes in speed are indicated for accomplishing starting, acceleration, cutting operation, deceleration, acceleration, operation at the fast speed between cuts, deceleration, acceleration, second cutting operation and deceleration to stop. This diagram also shows the succeeding period of operation of these relays for a return stroke of the table carrying the workpiece 35 as shown in Fig. 13, this return stroke being effected at the fast speed preceded by rapid acceleration and followed by deceleration to accurate stop.

The diagram of Fig. 14 in the lower part also shows the condition of the switches 6, 18, 19, 50, 52, 54, 55, 56, 57, 58, 60, 61, 62, 63 as shown in Fig. 5, as to whether opened or closed, during the forward or cutting stroke and the return stroke for the operations on the workpiece 35 shown in Fig. 13.

Fig. 15 represents a number of different combinations of speeds which may be attained by the apparatus of the invention with acceleration to speed $V_1$ and subsequent accelerations to speeds $V_2$ and $V_3$ followed by decelerations along the curve as shown again to speeds $V_1$ or $V_2$ or to standstill. For this purpose as shown in Fig. 15 the switches 60, 61, 62, 63 are arranged for engagement by dogs 80, 81, 82, 83, 84, these dogs being adjustably mounted in spaced locations along the table of a planer. The shapes of these dogs, as diagrammatically shown in Fig. 15, are such that portions thereof travel in four different paths of movement for engagement respectively with the switches 60, 61, 62, 63. The lengths of these portions of the dogs lengthwise of these paths is such as will determine the time of engagement with the respective switches so as to maintain the switch depressed in the manner described in connection with Figs. 5 and 6 for predetermined times to secure the operation of the motor at the speed which the switch is adapted to produce and for effecting the requisite change in these speeds at the proper time to secure the accelerations and decelerations as shown in the curve of Fig. 15. By providing the requisite contacts actuated by relays suitably arranged to function in the manner described in connection with Figs. 5 and 13 any combination of changes of speed may be secured with or without the improved method of acceleration of the direct current shunt field motor and with or without carrying out the Berthiez cycle and including the method of deceleration to a precise stop which has been described above.

In the auxiliary aspect of the invention above referred to for insuring safe stopping of the motor and of the member driven thereby in the event of reduction of voltage or failure of the power supply, Fig. 16 shows the wiring diagram of a system for accomplishing this purpose. The system of Fig. 16 may be utilized in combination with the control system which has been described above in connection with Fig. 5 for effecting acceleration and deceleration and the carrying out of the Berthiez cycle. In Fig. 16 certain of the relays, contacts and switches, as well as the field rheostat and other elements which operate in a similar manner in both figures have been given the same reference numerals as in Fig. 5. For the purposes of accomplishing a safe stopping certain additional parts are shown in Fig. 16 which condition the operation of the switches for starting and effecting running of the motor in forward and reverse directions, as well as for effecting braking thereof upon disconnection of the motor from the line.

Where a direct current motor is utilized to drive a machine requiring accurate stopping or the prevention of excessive overrun beyond a given amount of travel, as for example, in a machine tool, or where the inertia of the moving parts is high and, without adequate braking, the movement of the moving part would continue until it reached some mechanical stop which might cause damage, or as might be the case in a machine tool the member, such as the table, might over-travel the bed to a dangerous extent, it is essential that some means be provided for preventing such excessive travel in the event that the power supply fails and the stopping of the moving parts then would become dependent only on the frictional resistance unless some adequate braking means were brought into operation. Especially where electric braking is utilized in the normal operation of the machine as in the driving of machine tools by direct current motors where it is desirable to avoid the use of mechanical brakes, it is highly important that the electric braking be effective in the event of failure of the supply as well as during normal stopping of the motor with its shunt field connected with the supply. The auxiliary aspect of the invention as now will be described in connection with Fig. 16, provides for both such normal operation as well as for such emergency braking. Although the apparatus will be described particularly in connection with the operation of a machine tool it is equally applicable to the stopping of direct current shunt field motors which drive other types of machines.

It is a particular feature of the invention in this aspect thereof that the controls hereinabove described for producing forward and reverse rotation of the motor and the control of the excitation current in the shunt field to secure speed changes may be utilized, while at the same time providing means for continuing the excitation of the shunt field of the motor without reversal of the polarity thereof in the event of failure of the supply. For both the forward and the reverse directions of running in the event of such failure auxiliary relays and contacts are provided which are so connected to the supply and to the brushes of the motor and to the shunt field circuit that the direction of current flowing through the shunt field remains the same when, because of low voltage or because of failure of the power supply, the main contacts for operation in either direction through which the motor armature is supplied are opened.

Although the potential of the supply may be quickly reduced to zero and the relays for controlling the direction of rotation and speed of the motor may be quickly deenergized, flow of the current through the shunt field is continued in the same direction as when energized from the supply initially by virtue of the inductance of the shunt field. The energization of this field requisite for braking thus is maintained for a sufficient time for the relays utilized to effect changes in the connection of the circuits so that the potential of the counter E. M. F. of the motor is established across the shunt field in the proper direction before the shunt field excitation becomes so far reduced as to be ineffective for electric braking. Moreover, because of the residual magnetism of the field core ordinarily some counter E. M. F. will be generated so that, when the connection is established, the shunt field even though it has been reduced will build up again to such an extent that the potential supplied to this shunt field from the armature brushes is adequate to effect braking of the motor when the armature is short circuited through the braking resistance in the conventional manner.

In Fig. 16 the relays 25 and 26 are connected in the control circuit respectively to contact points 54 and 55 of the double throw reversing switch which operates in the same manner as described in connection with Fig. 5. From the hinge point of this double throw switch this control circuit is connected to the supply, through contact 27e closed, upon the energization of relay 28. This relay 28 remains energized as long as the normal supply voltage continues. Upon reduction or failure of this supply voltage contact 28a will be opened.

With contact 28a normally closed and the reversing switch closed to contact 54 thereof, relay 25 will be energized upon the closing of contact 27e. This contact 27e is closed upon energization of relay 27 connected across the supply in series with a normally open starting push button switch 70 and a normally closed stop push button switch 72 in a circuit which also includes the closed contact 28a. Energization of relay 27 closes its holding contact 27b to maintain the circuit through switch 72 and contact 28a. Upon pressing of the push button 70 contact 27c is closed to energize relay 25, thereby to close contact 25a to start the motor and contact 25c which is connected in circuit with the relay 4'. Closing of contact 25c energizes relay 4' to close contact 4'a which short circuits the series field 1' through a resistor 3. Because of the normal delay in the action of the relays or, if necessary, by utilizing means for delaying such action the series field is effective for a short time to aid in providing a high excitation of the field of the motor for securing high starting torque until this series field is short circuited. Energization of the relay 25 opens contact 25b to remove the short circuit of the armature through the braking resistance 32, this short circuit being established through a circuit which includes the contact 25b and the contact 26b as shown in Fig. 16.

During operation of the motor in the forward direction relay 26 is deenergized because the circuit therethrough is opened at the reversing switch by disconnection from the contact 56. When by manual operation or by automatic means in the manner described in connection with Fig. 5 this reversing switch is operated to close contact 56 the relay 26 will be energized and the relay 25 deenergized, thus to supply current to the motor in the reverse direction to effect reverse rotation of the motor. As is essential for both directions of running the energization of the shunt field must be maintained in the same direction for both directions of running. This direction of energization of the shunt field also must be maintained in the event of low voltage or failure of the supply. This is accomplished in the manner about to be described.

The normal circuit through the shunt field is established from the power supply through leads 90 and 92, contacts 27a and rheostat 7, the contacts 27a being closed when the relay 27 is energized as above stated by closing the push button switch 70, the holding contact 27b maintaining this relay energized as above described. It will be noted that the direction of current in the shunt field remains the same whether the motor is operated in the forward or in the reverse direction upon energization respectively of the relays 25 and 26.

When the supply fails or is reduced to a predetermined minimum voltage, relay 28 is deenergized and contact 28a opens thus deenergizing the relay 27. The contacts 27a then open and the back contacts 27'a are closed. The closing of contacts 27'a establishes the connection of the shunt field through leads 94 and 96 and leads 29 to the contacts 30a and 31a which respectively are closed by energization of relays 30 and 31. The closing of contacts 30a establishes the circuit from the brushes of the motor through leads 98 and 99, contacts 30a, leads 29, contacts 27'a and leads 94 and 96 to the shunt field 10 and its rheostat 7. The closing of contacts 31a establishes the circuit from the brushes of the motor through leads 98 and 99, contacts 31a, leads 29, contacts 27'a and leads 94 and 96 to the shunt field 10 and rheostat 7. As will be found from tracing these circuits, the contacts 31a connect leads 98 and 99 to leads 29 in the reverse relation to the connection of these leads effected by contacts 30a. Although the direction of rotation of the motor is reversed, therefore, the direction of the current in the shunt field remains the same when supplied from the motor armature by virtue of the counter E. M. F. after the failure of the supply.

Upon closure of the contacts 25a to start the motor rotating in a forward direction, the current flowing, for example, in the direction of the arrows, Fig. 16, in the armature circuit as well as in the field circuit, the coil 30 becomes energized by the closing of contact 25d. Upon such energization the circuit is maintained through holding contact 30b and back contact 26e now closed since when the motor is connected through the contacts 25a the relay 26 is deenergized as above mentioned. Although energization of relay 30 closes contacts 30a to connect the leads 29 to the leads 98 and 99 which are connected to the armature brushes, the circuit to the shunt field is not completed under these conditions since relay 27 is energized and contacts 27'a are open. When, because of the failure of the supply, contact 28a is open, relay 27 is deenergized and contacts 27a are opened and contacts 27'a are closed to supply the shunt field through the leads 29 as above described, relay 30 remaining energized as will be more fully explained.

Similarly, when the relay 26 is energized to close contact 26a the relay 31 is energized through closed contact 26d but the potential of the leads 98 and 99 is changed. Relay 31 is maintained energized through its holding contact 31b which is connected through back contact 25e which is closed when relay 25 is deenergized. At this time, however, back contact 26e is open, relay 26 being energized, thus deenergizing relay 30 and to open the connection of leads 98, 99 to leads 29 through the contacts 30a. The closing of contacts 31a, however, connects the leads 98, 99, the potential across which has now been reversed, to the leads 29. The current cannot flow to the shunt field through the contacts 27'a because the relay 27 will remain energized as long as contact 28a is held closed by the relay 28 when the supply is maintained. When, however, the supply fails and contact 28a is opened, relay 27 is deenergized and contacts 27a are opened and contacts 27'a are closed, thus connecting the leads 98, 99 with their potential reversed in the proper relation through the contacts 27'a to maintain the flow of the current in the shunt field the same.

It will be apparent from the above description and a consideration of Fig. 16 that when the braking contact 25b or 26b, as the case may be, closes respectively upon deenergization of the relays 25 and 26, thus establishing the short circuit through the braking resistance 32 across the armature brushes, the braking action becomes effective regardless of the direction of running of the motor at the moment that the supply fails since the shunt field excitation is maintained. If, under peculiar conditions, having regard to the differences in the inductance of the shunt field and the inherent time delay of the relays or other conditions of operation in opening and closing their contacts, the excitation of the shunt field becomes reduced the connection of this field directly across the armature brushes and in such a manner as to maintain the direction of current flowing therein the same makes possible the building up again of the field as long as the motor by virtue of its own inertia and of the parts driven thereby continues to run. It is necessary, however, that relays 30 and 31 be designed so that they will maintain the contacts 30a, 31a as well as holding contacts 30b and 31b closed even though a substantial reduction in the counter E. M. F. occurs. When so constructed such a degree of excitation is quickly restored as to make effective the braking action of the resistance 32 to accomplish braking and stopping of the motor and of the machine driven thereby within a short time and after a short travel rather than after indefinite time and a travel which may result in damage to the machine.

It will be understood that the contacts 25a, 25b and 25c are similar and perform similar control functions to the contacts of Fig. 5 with the same reference numerals. Similarly, the contacts 26a, 26b and 26c perform similar control functions to those of Fig. 5. Contacts 25d and 26d respectively are connected to the relays 30 and 31 for controlling the connection of the leads 98, 99 to the leads 29 respectively through contacts 30a and 31a to maintain the flow of the current in the shunt field in the proper direction depending upon direction of rotation of the motor when the supply fails. Contacts 25e and 26e are connected through the respective holding contacts 31b and 30b to relays 31 and 30 so as to prevent, when one or the other of these contacts 25e, 26e is open, the simultaneous energization of these relays.

Front contacts 25f and 26f respectively are opened upon energization of relays 25 and 26 to remove the short circuit of the rheostat 7 to make the rheostat effective for regular operation. In order to provide a high excitation at the moment of starting these contacts, however, both are closed to short circuit the rheostat until one or the other of them is opened upon energization of relays 25 or 26 concomitantly with starting of the motor in respective directions.

Where it is necessary or desirable to provide a time delay or time determination in order to accomplish the requisite succession in the operation of the different relays and switches to initiate and carry out an operation for a variation of the speed of the motor and the member driven thereby, time delay or time determining elements, such as dashpots or other conventional time delay means, for delaying the energization of a relay or the closing or opening of a contact thereof or for delaying the closing or opening of a switch may be utilized for the relays and switches of the different circuits of the system hereinabove described. Not only may the proper succession of operations of a driven member, such as the movable member of a machine tool, thus be secured to produce the movement of the tool relative to the workpiece at the proper speeds for engagement, cutting, exit, fast speed between cuts and for return stroke, but the desirable precision in producing the changes in speed in such a succession may be attained in some cases by the use of or auxiliary use of such time delay or time determining means.

Although for delayed closing of the contact 12a of the "superadjustment relay" a time delay element for the contact 4'f of relay 4' is disclosed, this delay, if desired, may be accomplished by energizing the relay 12 upon a predetermined rotation of the motor from an initial point which may be the starting point or may be the point from which the motor is moved having rotated a predetermined number of revolutions or having attained a given speed, for example, the minimum speed $V_1$. In a practical embodiment, such a timing means may be provided by suitably positioning a switch along the bed of the planer actuated, for example, by a dog similar to the dogs 66 or 68 to close the circuit to the relay 12 in a suitable time relation to the closing of the circuit to the relay 4' resulting from operation of the lever L or such a switch may be operated by the lever L in the same manner as but in the desired time relation to the operation of switches 50, 52, 53, 54, 55, 56, 67.

It will also be understood in connection with the claims that a predetermined rotation of the motor or a predetermined movement thereof results in a predetermined movement of the movable member of the machine driven thereby and that a predetermined movement of the movable member of the machine is concomitant with a predetermined movement of the workpiece carried by the movable member relative to the tool operating upon this workpiece. Although in the particular embodiment described the dogs are carried by the table of the planer and actuate switches in fixed locations along the bed of the planer, means may be provided which is operatively connected to the rotor of the motor and actuates switches or other means to effect the requisite operation of the relays in the manner described to produce the changes in speed.

Although for simplicity in the apparatus of Fig. 5 the "superadjustment relay" and the "superadjustment resistance" are so connected and so operated that the acceleration is effected along a characteristic leading to a higher speed in increasing the speed from the speed $V_1$ to the sped $V_2$, Fig. 13, similar acceleration may be accomplished as described in connection with Figs. 1 and 2 in proceeding from starting of the motor to increase the speed, for example, to speed $V_1$ along a characteristic leading to a higher speed, for example, speed $V_2$, by means of additional "superadjustment relays," dogs and switches actuated by the movement of the movable member of the machine tool. Rapid acceleration also may be effected between the speed $V_1$ and the speed $V_3$ by providing a third slider on the rheostat and a "superadjustment relay" connected in circuits similarly to those shown in Fig. 5 so as to accomplish the requisite excitation leading to a speed higher than speed $V_3$ when increasing the speed from $V_1$ to $V_3$.

Within the scope of the invention the methods which have been described above in the particular application thereof to the operation of a machine tool and the devices and apparatus for carrying out these methods of controlling the speed of a direct current shunt field motor and the securing of the improved acceleration and the precise deceleration and stopping thereof may be practiced in the use of direct current motors for driving other types of machines. The invention may be used in driving machines which by the nature of their operation require that the motor shall be started under greater or less load. In the operation of a machine tool, such as a planer, for example, the motor starts under substantial load and must accelerate the relatively heavy table or other movable part, although thereafter the load on the motor may increase upon engagement of the tool with the workpiece in the cutting operation. As above explained the deceleration of the motor and the stopping thereof are accomplished against the substantial inertia of the moving parts of the machine tool. The method and the apparatus of the invention may be used for starting other machines under load, either of a type which continue in operation when started or of the reciprocating type which require frequent starting and stopping. The "superadjustment" resistance and the relay and its contact associated therewith may be used whether or not subsequent thereto further speed changes are to be effected in the operation of the machine driven by the motor. The "first preparation" resistance and the relay associated therewith, as well as the "second preparation" relay and contact, for successively and in a stepped manner increasing the excitation of the shunt field for the purpose of securing precise stopping of the motor may be used in connection with a direct current shunt field motor which drives a continuously operating machine. Various combinations of these devices may be utilized for particular purposes to secure desired changes of speed, particularly rapid acceleration and precise stopping for particular purposes. All such variations are intended to be within the scope of the following claims.

This application is a continuation-in-part of the application Serial No. 587,712, filed April 11, 1945, now Patent No. 2,462,120.

We claim:

1. In apparatus for controlling the speed of a direct current motor by variation of the excitation of the shunt field, the combination with a shunt field winding of the motor, of a rheostat connected in circuit with said winding for controlling the current flowing in said winding at a value corresponding to a speed higher than a predetermined running speed of said motor, and current control means connected in circuit with said winding and responsive to a change in the speed of said motor during acceleration thereof and cooperating with said rheostat for changing substantially at said predetermined speed during said acceleration of the motor the excitation current of the shunt field of said motor from said value corresponding to said higher speed to a value determining said predetermined speed at which said motor continues to run.

2. In apparatus for controlling the speed of a direct current motor by variation of the excitation of the shunt field, the combination with a shunt field winding of the motor, of a rheostat connected in circuit with said winding for controlling the current flowing in said winding at a value corresponding to a speed higher than a predetermined running speed of said motor, and current control means connected in circuit with said winding and responsive to a change in the speed of said motor during an acceleration thereof and effective in cooperation with said rheostat substantially at said predetermined speed for increasing the excitation current of the shunt field to determine the speed at which the motor continues to run.

3. In apparatus for controlling the speed of a direct current motor by variation of the excitation of the shunt field, the combination with a shunt field winding of the motor, of a rheostat connected in circuit with said winding for controlling the current flowing in said winding at a value corresponding to a speed higher than a predetermined running speed of said motor, a superadjustment resistance in a circuit connected in parallel with the current carrying portion of said rheostat, a contact in said parallel circuit actuatable to connect said superadjustment resistance in parallel with the current carrying portion of said rheostat, a relay energizable to actuate said contact to effect said connection, and time delay means operatively connected to said relay and actuated upon a predetermined increase in the speed of said motor in a predetermined time period for energizing said relay to effect said parallel connection of said superadjustment resistance with said current carrying portion of said rheostat.

4. In apparatus for controlling the speed of a direct current motor by variation of the excitation of the shunt field, the combination with a shunt field winding of the motor, and means for connecting said motor to a supply, of a rheostat connected in circuit with said winding for controlling the current flowing in said winding at a value corresponding to a speed higher than a predetermined running speed of said motor, a superadjustment resistance, a superadjustment relay having a contact connected in circuit with said superadjustment resistance and said rheostat to connect said superadjustment resistance in parallel with the current carrying portion of said rheostat upon operation of said contact by said relay, a conditioning relay having a contact connected in circuit with said superadjustment relay for operating said relay upon actuation of said conditioning relay contact, said conditioning relay being operatively connected to said means for connecting the motor to said supply to effect operation of said relays and actuation of their contacts to connect said superadjustment resistance in parallel with said current carrying portion of said rheostat to reduce the resistance of said circuit which includes said winding in a predetermined relation to the acceleration of said motor after connection thereof to said supply.

5. In apparatus for controlling the speed of a direct current motor by variation of the excitation of the shunt field, the combination as defined in claim 3 which comprises a supplemental relay having a contact opened upon energization of said supplemental relay, said contact being connected in a circuit which includes at least a part of the current carrying portion of said rheostat, and means operatively connected to said time delay means to energize said supplemental relay to open said circuit concomitantly with the operation of said time delay means to effect said parallel connection of said superadjustment resistance.

6. In apparatus for controlling the speed of a direct current motor driving a movable member of a machine by variation of the excitation of the shunt field, and combination with a shunt field winding of the motor, and means for connecting the motor to a supply, of a rheostat connected in circuit with said winding for controlling the current flowing in said winding at a value corresponding to a speed higher than a predetermined running speed of the motor, a superadjustment resistance, a conditioning relay operatively connected to said means for connecting the motor to said supply so as to energize said conditioning relay upon operation of said connecting means to connect the motor to said supply, a supplemental relay effective when deenergized to close a supplemental contact thereof in a circuit which includes a part of said rheostat, means actuated by said movable member of said machine for energizing said supplemental relay to open said supplemental contact, a superadjustment relay connected in circuit with a contact of said conditioning relay to energize said superadjustment relay upon closing of said conditioning relay contact, said conditioning relay being provided with means for delaying the closing of said contact thereof to delay the energization of said superadjustment relay after the energization of said supplemental relay, and a contact of said superadjustment relay in circuit with said superadjustment resistance and said rheostat to connect said superadjustment resistance in parallel with the current carrying portion of said rheostat upon energization of said superadjustment relay.

7. In apparatus for controlling the speed of a direct current motor by variation of the excitation of the shunt field, the combination as defined in claim 1, which comprises means responsive to a predetermined rotation of said motor for alternatively connecting different portions of said rheostat in the circuit which includes said shunt field winding to change the excitation of said shunt field so as to change the speed of said motor.

8. In apparatus for controlling the speed of a direct current motor by variation of the excitation of the shunt field, the combination with a shunt field winding of the motor, a rheostat connected in circuit with said winding for controlling the current flowing in said winding, of a resistance adapted to be connected in circuit with and to cooperate with said rheostat to control said shunt field excitation current, a control contact connected in circuit with said resistance for establishing said connection to said rheostat, means responsive to a predetermined rotation of said motor during an acceleration thereof and operatively connected to said control contact for connecting said resistance in the shunt field excitation circuit so as to cooperate with said rheostat to reduce the resistance of said shunt field circuit, said rheostat being provided with a plurality of wiping contacts, and means responsive to predetermined rotation of said motor and operatively connected to said wiping contacts for selectively connecting said wiping contacts to said winding for connecting different amounts of resistance of said rheostat in series with said shunt field winding to produce a plurality of speeds of said motor.

9. In apparatus for controlling the speed of a direct current motor by variation of the excitation of the shunt field, the combination with a shunt field winding of the motor, and a rheostat connected in circuit with said winding for controlling the excitation current flowing in said winding, of current control means connected in circuit with said rheostat for connecting a portion of the rheostat which is connected in circuit with the shunt field and carries the field excitation current in parallel with another portion of said rheostat excluding said current carrying portion to reduce the resistance of said rheostat which is in circuit with said shunt field by an amount which is in direct relation to the resistance of said current carrying portion, whereby to increase the excitation of the shunt field and reduce the speed of the motor.

10. In apparatus for controlling the speed of a direct current motor by variation of the excitation of the shunt field, the combination with a shunt field winding of the motor, and a rheostat connected in circuit with said winding for controlling the excitation current flowing in said winding, of a resistance connected in a circuit in parallel with the current carrying portion of said rheostat which is in circuit with said shunt field, and a contact in said parallel circuit operatively connected to the motor so as to be actuated in response to a predetermined rotation of said motor to effect said parallel connection to increase the excitation of said shunt field to reduce the speed of said motor.

11. In apparatus for controlling the speed of a direct current motor driving a movable member of a machine by variation of the excitation of the shunt field, the combination with a shunt field winding of the motor, and a rheostat connected in circuit with said winding for controlling the excitation current flowing in said winding, of a first preparation resistance in a circuit in parallel with the current carrying portion of said rheostat and in series with the non-current-carrying portion of said rheostat, a contact in said circuit actuatable to establish the connection of said resistance and said non-current-carrying portion of said rheostat which are in series with each other in parallel with said current-carrying portion of said rheostat, and means actuated by said movable member of said machine upon a predetermined movement thereof and operatively connected to said contact for closing said contact to effect said parallel connection to increase the excitation of said motor and reduce the speed thereof concomitantly with said predetermined movement of said member.

12. In apparatus for controlling the speed of a direct current motor by variation of the excitation of the shunt field, the combination with a shunt field winding of the motor, and a rheostat connected in circuit with said winding for controlling the current flowing in said winding, of a first preparation resistance, a first preparation contact, said resistance being connected in series with the non-current-carrying portion of said rheostat in a circuit which includes said contact, said circuit being in parallel with the current-carrying portion of said rheostat upon closing of said contact, a first preparation relay effective when energized to close said first preparation contact to effect said connection of said resistance and said non-current-carrying portion of said rheostat in series therewith in parallel with said current-carrying portion thereof, and means actuated by a member driven by said motor and operatively connected to said relay and effective to energize said relay upon completion of a predetermined movement of said member to effect said parallel connection to reduce the speed of the motor.

13. In apparatus for controlling the speed of a direct current motor driving a movable member of a machine by variation of the excitation of the shunt field, the combination with a shunt field winding of a motor, and a rheostat connected in circuit with said winding for controlling the current flowing in said winding, of a first preparation resistance, a first preparation contact, said resistance and said contact being connected in series with each other and in series with the non-current-carrying portion of said rheostat and in parallel with the current-carrying portion of said rheostat upon closing of said contact, a first preparation relay effective when energized to close said first preparation contact to effect said parallel connection with said current-carrying portion, and a switch in a circuit with said first preparation relay actuated by said movable member of said machine to energize said relay upon a predetermined movement of said movable member.

14. In apparatus for controlling the speed of a direct current motor driving a movable member of a machine by variation of the excitation of the shunt field, the combination with a shunt field winding of the motor, a rheostat connected in circuit with said winding for controlling the current flowing in said winding, and means for connecting and disconnecting the motor to a supply for effecting running and stopping thereof, of a first preparation resistance, a first preparation contact, said resistance and said contact being connected in series with each other and in series with the non-current-carrying portion of said rheostat and in parallel with the current-carrying portion of the rheostat upon closing of said contact, a first preparation relay effective when energized to close said first preparation contact to effect said parallel connection, and a switch in a circuit with said first preparation relay actuated by said movable member of said machine upon a predetermined movement thereof to energize said relay, said switch and said means for connecting and disconnecting the motor to the supply being operatively connected to effect said energization of said relay before operation of said means to disconnect said motor from the supply.

15. In apparatus for controlling the speed of a direct current motor driving a movable member of a machine tool by variation of the excitation of the shunt field, the combination with a shunt field winding of the motor, and a rheostat connected in circuit with said winding and having a wiping contact movable to control the excitation current flowing in said winding, and means for connecting and disconnecting the motor to and from a supply for effecting running and stopping thereof, of a supplemental relay effective upon deenergization thereof to close a supplemental contact thereof in a circuit which includes a part but not all of a current-carrying portion of said rheostat to connect said part of the rheostat in series with said winding, said contact being in a circuit in parallel with the circuit which includes said wiping contact, a deceleration contact connected in a circuit in parallel with said current-carrying portion of said rheostat closed upon closing of said deceleration contact, a deceleration relay energizable to effect closure of said deceleration contact, a switch connected in circuit with said deceleration relay and actuated by said movable member for energizing said deceleration relay to close said deceleration contact to close said parallel circuit to increase the excitation current to reduce the speed of the motor and said movable member driven thereby during continuous movement thereof, and a switch actuated by said movable member and connected in circuit with said supplemental relay to energize and deenergize said supplemental relay upon operation of said switch and operatively connected to said means for connecting and disconnecting the motor to and from the supply to effect deenergization of said supplemental relay before operation of said connecting and disconnecting means to disconnect the motor from the supply.

16. In apparatus for controlling the speed of a direct current motor driving a movable member of a machine tool by variation of the excitation of the shunt field, said movable member being adapted to effect movement of the workpiece and the tool one relative to the other, the combination with a shunt field winding of the motor, and a rheostat connected in circuit with said winding and having a wiping contact movable to control the current flowing in said winding, of at least one additional wiping contact for said rheostat, said rheostat wiping contacts respectively being connected through speed interchange contacts in circuit with said shunt field winding, a speed interchange relay energizable to close one of said speed interchange contacts to connect one of said wiping contacts in circuit with said shunt field winding for producing a lower speed and to open another speed interchange contact, and respectively to open and close said speed interchange contacts to connect another of said wiping contacts in circuit with the shunt field winding for producing a higher speed upon deenergization of said speed interchange relay, and means actuated by said movable member of said machine tool concomitantly with engagement and disengagement of the tool and the workpiece for respectively energizing and deenergizing said speed interchange relay for actuating said speed interchange contacts to effect the connection of the shunt field winding respectively to said lower speed wiping contact of said rheostat and to said higher speed contact.

17. In apparatus for controlling the speed of a direct current motor by varaitoin of the excitation of the shunt field, the combination with a shunt field winding of the motor, and a rheostat connected in circuit with said winding for controlling current flowing in said winding, of a resistance in a circuit in parallel with said rheostat to cooperate therewith upon closing of said parallel circuit to control said shunt field excitation current to control the speed of the motor, a control contact in said parallel circuit actuated concomitantly with accelerating operation of the motor for connecting said resistance in said parallel circuit so as to cooperate with said rheostat to reduce the resistance of the shunt field circuit substantially upon attainment of a predetermined speed, and means actuated concomitantly with completion of a predetermined operation of said motor and operatively connected to control means in circuit with said rheostat for connecting a portion of said rheostat which is connected in circuit with the shunt field of the motor and carries said excitation current in parallel with another portion of said rheostat excluding said current carrying portion to reduce the resistance of said rheostat which is in circuit with the shunt field, whereby to increase the excitation of the shunt field and reduce the speed of the motor.

18. In apparatus for controlling the speed of a direct current motor driving a movable member of a machine tool by variation of the excitation of the shunt field, the combination with a shunt field winding of the motor, and a rheostat connected in circuit with said winding and provided with means for adjustably determining a current carrying portion and a non-current carrying portion of the rheostat for controlling the current flowing in said winding, of a superadjustment resistance, a circuit including said rheostat and said resistance and a contact actuatable to connect said superadjustment resistance in parallel with said rheostat, a superadjustment relay energizable to actuate said contact to effect said connection, means actuated concomitantly with accelerating operation of said motor to drive said movable member and operatively connected to said superadjustment relay for energizing said relay to effect said parallel connection of said superadjustment resistance with said rheostat substantially upon attainment of a predetermined speed of the motor, a preparation circuit connected to said rheostat and including a preparation contact actuatable to connect said preparation circuit in parallel with the current carrying portion of the resistance of the rheostat and to connect the non-current carrying portion of said rheostat in parallel with said current carrying portion thereof to increase the excitation current, a preparation relay energizable to acutate said preparation contact to effect said parallel connection of said non-current carrying portion with said current carrying portion of said rheostat, and means actuated by said movable member of said machine tool and operatively connected to said preparation relay for energizing said preparation rely, whereby preparatory to stopping the motor the speed thereof is reduced to a speed in a predetermined relation to the running speed from which said reduction was effected.

19. In apparatus for controlling the speed of a direct current motor by variation of the excitation of the shunt field, the combination with a shunt field winding of the motor, and a rheostat connected in circuit with said winding for controlling the current flowing in said winding, of a first preparation circuit in series with the non-current-carrying portion of said rheostat and in parallel with the current carrying portion thereof a first preparation contact in said circuit actuatable to close said circuit to connect said non-current-carrying potrion of said rheostat in parallel with the current-carrying portion of said rheostat, and a second preparation contact in a circuit in parallel with at least a section of said rheostat to short circuit said section upon closing of said second preparation contact so as to reduce the resistance of the shunt field circuit to reduce the speed of the motor to a predetermined speed.

20. In apparatus for controlling the speed of a direct current motor by variation of the excitation of the shunt field, the combination with a shunt field winding of the motor, a rheostat connected in circuit with said winding for controlling the current flowing in said winding, and means for connecting the motor to and disconnecting it from a supply for effecting running and stopping thereof, of a first preparation circuit in series with the non-curent carrying portion of said rheostat and in parallel with the current carrying portion thereof, a first preparation contact in said circuit actuatable to connect said non-current carrying portion of said rheostat in parallel with the current carrying portion of said rheostate, a second preparation contact in a circuit in parallel with at least a section of said rheostat to short circuit said section upon closing of said second preparation contact so as to reduce the resistance of the shunt field circuit to reduce the speed of the motor to a predetermined speed, a braking resistance connectible in a circuit across the armature of said motor, braking contacts in said circuit actuated by said means for connecting and disconnecting said motor to and from the supply upon such disconnection to connect said braking resistance across the motor armature, and means actuated in a predetermined relation to the rotation of said motor successively to actuate said first and second preparation contacts and said means for disconnecting said motor from said supply and said contacts in said braking resistance circuit to reduce the speed of the motor substantially to said predetermined speed and to initiate braking action substantially at said speed independently of the speed of the motor from which the reduction of speed was effected.

21. In apparatus for controlling the speed of a direct current motor by variation of the excitation of the shunt field, the combination with a shunt field winding of the motor, a rheostat connected in circuit with said winding for controlling the current flowing in said winding, and means for connecting the motor to and disconnecting it from a supply for effecting running and stopping thereof, of a first preparation resistance in a circuit in series with the non-current carrying portion of said rheostat and in parallel with the current carrying portion thereof, a first preparation contact in said circuit actuatable to connect said resistance and said non-current carrying portion of said rheostat which are in series with each other in parallel with the current carrying portion of said rheostat, an intermediate speed contact in a circuit connected in series with a predetermined part of said current carrying portion of the rheostat so as to short circuit all of said rheostat except said predetermined part thereof upon actuation of said intermediate speed contact, and means actuated by a member driven by said motor for actuating said first preparation contact and said intermediate contact in succession to reduce the speed of the motor in steps from a given operating speed to a predetermined lower operating speed above the minimum operating speed secured by complete short circuiting of the rheostat.

22. In apparatus for controlling the speed of a direct curent motor driving a movable member of a machine by variation of the excitation of the shunt field, the combination with a shunt field winding of the motor, and a rheostat connected in circuit with said winding for controlling the current flowing in said winding, of a first preparation contact connected in a circuit in series with the non-current carrying portion of said rheostat and in parallel with the current carrying portion thereof to connect said non-current carrying portion in parallel with the current carrying portion of said rheostat upon closing of said first preparation contact, a first preparation relay effective when energized to close said first preparation contact to effect said parallel connection of said non-current carrying portion of the rheostat with said current carrying portion thereof, a switch in a circuit with said first preparation relay actuated by said movable member of said machine to energize said relay upon a predetermined movement of said movable member, an intermediate speed contact connected in a circuit in parallel with a substantial part but not all of said current carrying portion of said rheostat to leave connected a predetermined part of said rheostat in series with said field winding upon closing of said intermediate speed contact, an intermediate speed relay effective when energized and deenergized respectively to open and to close said intermediate speed contact, and a switch in circuit with said intermediate speed relay and actuated by said movable member of said machine to deenergize said intermediate speed relay upon a predetermined movement of said movable member, said switches being actuated by said movable member to effect actuation of said first preparation contact to connect said non-current carrying portion of said rheostat in parallel with the current carrying portion thereof prior to the actuation of said intermediate speed contact to secure a reduced speed of the motor.

23. In combination with a reciprocating part, a direct current motor adapted to drive said part, a motor field adapted to determine the speed of said motor, means for controlling said motor speed which includes: a source of suitable excitation current for said motor field; a first field resistance; adjustable connecting means for dividing said first resistance into a first portion and a second portion, a first control circuit connecting said motor field, said source of excitation current, said adjustable connecting means, and said first portion in series to determine the operating speed of said motor; a second field resistance, a second control circuit connecting said second portion and said second field resistance in series; a third control circuit adapted to short circuit the greater portion of both said first field resistance and said second field resistance to impart a relatively low speed to said motor; a braking resistance for said motor armature; a first electrical control means adapted to connect said second circuit in parallel with said first portion; a second electrical control means for connecting said third circuit for effecting said short circuit to impart to said motor said relatively slow speed; a third electrical control means for connecting said motor armature and said control circuits to drive said part in a forward sense, and a fourth electrical control means for connecting said motor armature and said control circuits to drive said part in a reverse sense; a fifth electrical control means adapted to disconnect said motor from its power source and to connect it to said braking resistance when said third electrical control means or said fourth electrical control means are being actuated; a first electrical control operating means on said reciprocating part adapted to operate said first electrical control means and said second electrical control means and de-actuating said third electrical control means and actuating said fourth electrical control means in their named sequence at the end of a stroke in a forward sense and adapted to cause deceleration to a precise stopping point and to reverse said reciprocating part; and a second electrical control operating means on said reciprocating part adapted to operate said first electrical control means and said second electrical control means and de-actuating said fourth electrical control means and actuating said third electrical control means in the sequence named at the end of a stroke in a reverse sense and adapted to decelerate to a precise stopping point and reverse said reciprocating part.

24. A combination as described in claim 23 and in addition, a fourth control circuit adapted, when connected, to increase the excitation in said variable shunt field to a value substantially in excess of a value corresponding to said relatively low speed, a sixth and seventh electrical control means for completing respectively said second and fourth circuits; and electrical control operating means on said reciprocating part for operating said sixth and seventh electrical control means.

25. A combination as described in claim 23 which includes in addition an auxiliary resistance in parallel with said motor field resistance, and switch means for disconnecting said parallel resistance during periods of acceleration.

26. The method of starting a direct current motor and for controlling its speed by variation of the shunt field excitation thereof, which comprises energizing said shunt field and the armature of said motor to effect starting thereof, controlling the excitation of the shunt field initially to produce and to maintain during the acceleration of said armature an excitation corresponding to a speed higher than the speed desired to be attained, and substantially when said desired speed is attained abruptly changing the excitation of said shunt field to produce the excitation corresponding to the desired speed.

27. The method of controlling the speed of a direct current motor by variation of the shunt field excitation thereof, which comprises energizing the shunt field and the armature of said motor to effect rotation of said armature, controlling the excitation of the shunt field initially to produce and to maintain during acceleration of said armature an excitation corresponding to a speed higher than the running speed desired to be attained so as to effect acceleration of said armature of the motor, abruptly changing the excitation of said shunt field as said running speed substantially is attained in such acceleration to produce the excitation corresponding to the running speed, abruptly increasing the excitation of the shunt field from the excitation which produces the running speed by an increment of excitation which is greater when the running speed is greater than when the running speed is less to effect deceleration of the motor, and concomitantly with said motor reaching a reduced speed determined by said increased excitation again increasing the excitation to produce a predetermined minimum operating speed of said motor.

28. The method of controlling the speed of a direct current motor by variation of the shunt field excitation thereof as defined in claim 27, which comprises short circuiting the armature of said motor through a braking resistance substantially upon said motor reaching said predetermined minimum operating speed.

29. The method of operating a machine tool or the like to effect cutting of a workpiece by a tool, which comprises effecting movement of the workpiece and the tool relative to each other to bring the tool into engagement with the workpiece at a speed below the desired cutting speed suitable for preventing damage to the tool or the workpiece, increasing the speed of the relative movement of the tool and the workpiece to the desired cutting speed after such engagement, and before the tool is disengaged from the workpiece decreasing the relative speed of the tool and the workpiece to a speed suitable for exit of the tool from the workpiece without damage to the tool or the workpiece.

30. The method of operating a machine tool or the like driven by a direct current motor to effect cutting of a workpiece by a tool which comprises effecting movement of the workpiece and the tool relative to each other by the driving operation of the motor to bring the tool into engagement with the workpiece at a speed below the desired cutting speed suitable for preventing damage to the tool or the workpiece, effecting acceleration of the motor after such engagement along a speed characteristic which if said acceleration along said characteristic were maintained would lead to a speed higher than the speed of the motor suitable for producing the desired cutting speed of the workpiece and the tool relative to each other, and substantially when said desired cutting speed is attained stopping said acceleration and maintaining operation of the motor at said desired cutting speed.

31. The method of operating a machine tool or the like driven by a direct current motor to effect cutting of a workpiece by a tool as defined in claim 30, which comprises decelerating the speed of the motor before the tool is disengaged from the workpiece to produce a speed of the tool and the workpiece relative to each other suitable for exit of the tool from the workpiece without damage to the tool or the workpiece.

32. In apparatus for controlling the speed of a direct current motor driving a movable member of a machine tool by variation of the excitation of the shunt field of said motor, said movable member being adapted to effect movement of a workpiece and a tool one relative to the other, the combination with a shunt field winding of the motor, and a rheostat connected in circuit with said winding for controlling the current flowing in said winding, of circuit control means cooperating with said rheostat to connect said rheostat to said winding to determine at least two different resistances thereof alternatively connectible in said circuit to produce predetermined shunt field excitation currents corresponding respectively to a given operating speed and a higher operating speed, means actuated by said movable member concomitantly with engagement of said tool and said workpiece and operatively connected to said circuit control means cooperating with the rheostat to actuate said control means to determine said given speed, and means actuated thereafter by said movable member and operatively connected to said circuit control means cooperating with the rheostat to actuate said control means to determine said higher speed for the tooling operation.

33. In apparatus for controlling the speed of a direct current motor driving a movable member of a machine tool by variation of the excitation of the shunt field of said motor, said movable member being adapted to effect movement of a workpiece and a tool one relative to the other, the combination with a shunt field winding of the motor, of a rheostat connected in circuit with said winding and having a wiping contact connectible in said circuit and movable to control the current flowing in said winding to provide a given speed of said motor, at least one additional wiping contact for said rheostat connectible in said circuit with said winding and movable to control the current in said winding to provide a higher speed of said motor, said rheostat wiping contacts respectively being connected through speed interchange contacts in circuit with a source of supply and with said shunt field winding, means actuated by said movable member of said machine tool concomitantly with movement of the tool and the workpiece relative to each other and operatively connected to said speed interchange contacts for actuating said speed interchange contacts to effect connection of said shunt field winding to the wiping contact of said rheostat producing said given speed for engagement of said tool and said workpiece, and means actuated thereafter by said movable member and operatively connected to said speed interchange contacts for actuation of said contacts to effect connection of said shunt field winding to said wiping contact producing the higher speed for effecting the tooling operation.

34. In apparatus for controlling the speed of a direct current motor driving a movable member of a machine tool the combination as defined in claim 33 which comprises means actuated by said movable member of said machine tool and operatively connected to said speed interchange contacts for actuating said speed interchange contacts to effect connection of the shunt field winding to the wiping contact of said rheostat producing said given speed concomitantly with disengagement of said tool and said workpiece.

35. In apparatus for controlling the speed of a direct current motor driving a movable member of a machine tool, the combination as defined in claim 33 which comprises a speed interchange relay for actuating said speed interchange contacts, said means actuated by said movable member comprising switch means operable by said movable member adjacent predetermined positions of said movable member as it moves said workpiece relative to said tool, said switch means being connected in a circuit with said relay to control said relay so as to actuate said speed interchange contacts to effect connection of said shunt field winding to the wiping contact of said rheostat producing said given speed concomitantly with engagement of said tool with said workpiece and to actuate said speed interchange contacts to effect connection of said shunt field winding to the wiping contact producing said higher speed after said engagement of said tool with said workpiece.

36. The method of decelerating a direct current motor from a running speed to the minimum operating speed which comprises abruptly changing an energizing current of said motor from the value which determines said running speed of the motor to a value intermediate between said running speed value and the value which determines the minimum operating speed of the motor, the amount of such change being greater when said running speed of said motor is high than when said running speed of the motor is low, and again abruptly changing the energizing current to a value corresponding to said minimum operating speed.

37. In apparatus for controlling the speed of a direct current motor driving a movable member of a machine by variation of the excitation of the shunt field, the combination with a shunt field winding of the motor, a rheostat connected in circuit with said winding for controlling the excitation current flowing in said winding, means for connecting the motor to and disconnecting it from a supply for effecting running and stopping thereof, a braking resistance in a circuit connected across the armature of the motor, and a braking contact in said circuit for closing said circuit, of a first preparation resistance in a circuit in parallel with the current carrying portion of said rheostat and in series with the non-current carrying portion of said rheostat, a contact in said circuit actuatable to establish the connection of said resistance and said non-current carrying portion of said rheostat which are in series with each other in parallel with said current carrying portion of said rheostat, means actuated by said movable member of said machine upon a predetermined movement thereof and operatively connected to said contact for closing said contact to effect said parallel connection to increase the excitation of said motor to reduce the speed thereof concomitantly with said predetermined movement of said member, and means actuated by said movable member upon said predetermined movement thereof and operatively connected to said means for connecting and disconnecting said motor and operatively connected to said braking contact for disconnecting the motor from said supply and closing said circuit through said armature and said braking resistance.

38. In apparatus for controlling the speed of a direct current motor by variation of the excitation of the shunt field, the combination with a shunt field winding of the motor, a rheostat connected in circuit with said winding for controlling the current flowing in said winding, and means for connecting the motor to and disconnecting it from a supply for effecting running and stopping thereof, of a first preparation resistance in a circuit in series with the non-current carrying portion of said rheostat and in parallel with the current carrying portion thereof, a first preparation contact in said circuit actuatable to connect said resistance and said non-current carrying portion of said rheostat which are in series with each other in parallel with the current carrying portion of said rheostat, a minimum speed contact in a circuit connected in parallel with the current carrying portion of said rheostat so as to short circuit all of said rheostat upon actuation of said minimum speed contact, and means actuated by a member driven by said motor for actuating said first preparation contact and said minimum speed contact in succession to reduce the speed of the motor in steps from a given operating speed to the minimum operating speed secured by complete short circuiting of the rheostat.

39. In apparatus for controlling the speed of a direct current motor by variation of the excitation of the shunt field, the combination with a shunt field winding of the motor, of a rheostat connected in circuit with said winding for controlling the current flowing in said winding at a value corresponding to a speed higher than a predetermined running speed of said motor, a superadjustment resistance in a circuit connected to said rheostat circuit, and means responsive to a change in the speed of said motor during an acceleration in a predetermined time period for connecting said superadjustment resistance in parallel with the current-carrying portion of said rheostat substantially when said motor attains said predetermined speed.

40. In apparatus for controlling the speed of a direct current motor by variation of the excitation of the shunt field, the combination as defined in claim 4 in which said contact of said conditioning relay is a time delay contact and said conditioning relay is provided with a second contact, a supplemental relay having a contact opened upon energization of said supplemental relay, said supplemental relay contact being connected in a circuit which includes at least a part of the current carrying portion of said rheostat, said supplemental relay being connected in circuit with said second contact of said conditioning relay so as to be energized upon operation of said second contact, thereby to actuate said supplemental relay contact to open said circuit which includes said part of said current carrying portion of said rheostat concomitantly with actuation of said time delay contact of said conditioning relay.

GEORGES GABRIEL MOZZANINI.
MAURICE LEBERTRE.

REFERENCES CITED

The following references are of record in the file of this patent:

UNITED STATES PATENTS

| Number | Name | Date |
|---|---|---|
| 1,031,573 | Naumann | July 2, 1912 |
| 1,057,045 | Du Bois | Mar. 25, 1913 |
| 1,155,197 | Beach | Sept. 28, 1915 |
| 1,305,961 | Burgess | June 3, 1919 |
| 1,462,354 | Pero | July 17, 1923 |
| 1,728,633 | Schmidt | Sept. 17, 1929 |
| 1,860,499 | Furnas et al. | May 31, 1932 |
| 2,081,977 | Bendz | June 1, 1937 |
| 2,205,566 | Kollner | June 25, 1940 |
| 2,220,748 | Whiting | Nov. 5, 1940 |
| 2,235,558 | Mathewson et al. | Mar. 18, 1941 |
| 2,363,929 | Banks et al. | Nov. 28, 1944 |